(12) United States Patent
Nakao et al.

(10) Patent No.: US 10,080,460 B2
(45) Date of Patent: Sep. 25, 2018

(54) BEVERAGE EXTRACTION APPARATUS

(75) Inventors: Yoshihiro Nakao, Kawasaki (JP);
Yoshiaki Yokoo, Kawasaki (JP);
Makoto Nakajima, Kawasaki (JP);
Hiroaki Shimizu, Kawasaki (JP);
Hiroki Furuta, Kawasaki (JP); Morio Mitsuhashi, Atsugi (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 1166 days.

(21) Appl. No.: 13/979,888

(22) PCT Filed: Aug. 24, 2011

(86) PCT No.: PCT/JP2011/069071
§ 371 (c)(1),
(2), (4) Date: Dec. 6, 2013

(87) PCT Pub. No.: WO2012/098726
PCT Pub. Date: Jul. 26, 2012

(65) Prior Publication Data
US 2014/0083301 A1 Mar. 27, 2014

(30) Foreign Application Priority Data

Jan. 17, 2011 (JP) .................................. 2011-007382

(51) Int. Cl.
*A47J 31/06* (2006.01)
*A47J 31/44* (2006.01)
(Continued)

(52) U.S. Cl.
CPC .............. *A47J 31/44* (2013.01); *A23F 5/262* (2013.01); *A47J 31/407* (2013.01); *B65D 85/8043* (2013.01)

(58) Field of Classification Search
CPC A47J 31/20; A47J 31/22; A47J 31/407; A47J 31/44; A23F 5/262
(Continued)

(56) References Cited

U.S. PATENT DOCUMENTS 2,770,181 A 11/1956 Kahan
4,962,693 A * 10/1990 Miwa ...................... A47J 31/42
99/283

(Continued)

FOREIGN PATENT DOCUMENTS

CN 1681425 A 10/2005
CN 101687592 A 3/2010
(Continued)

OTHER PUBLICATIONS

PCT/JP2011/069071—International Search Report dated Oct. 11, 2001.
(Continued)

*Primary Examiner* — Brian Jennison
(74) *Attorney, Agent, or Firm* — Drinker Biddle & Reath LLP

(57) ABSTRACT

A roasted plant extraction apparatus is provided which is capable of selectively reducing excessive bitterness in an extract liquid obtained by water extraction from a roasted plant raw material while preserving desirable flavor ingredients and body. A beverage extraction apparatus includes a granule containing part adapted to contain granules for extraction of a beverage, a pouring device for pouring an extraction solvent into the granule containing part from a first direction, and a collecting device for collecting an extract liquid extracted by means of the extraction solvent. The granule containing part comprises a detachable restraining member for placing the granules in a substantially sealed (Continued)

state. The beverage extraction apparatus further comprises a rotary mechanism for rotating the granule containing part.

12 Claims, 16 Drawing Sheets

(51) Int. Cl.
*A23F 5/26* (2006.01)
*A47J 31/40* (2006.01)
*B65D 85/804* (2006.01)

(58) Field of Classification Search
USPC ......... 99/295, 300, 302 C, 323; 426/77, 115, 426/433
See application file for complete search history.

(56) References Cited

U.S. PATENT DOCUMENTS

| | | | | |
|---|---|---|---|---|
| 5,265,517 A | * | 11/1993 | Gilbert | A23F 5/26 99/280 |
| 2008/0041234 A1 | * | 2/2008 | Cortese | A47J 31/0673 99/290 |
| 2010/0239733 A1 | | 9/2010 | Yoakim et al. | |
| 2010/0239734 A1 | * | 9/2010 | Yoakim | A47J 31/22 426/433 |
| 2011/0003046 A1 | * | 1/2011 | Yoakim | A47J 31/22 426/431 |

FOREIGN PATENT DOCUMENTS

| | | | |
|---|---|---|---|
| CN | 101849775 A | 10/2010 | |
| JP | 4-038919 A | 2/1992 | |
| JP | 2578316 | 11/1994 | |
| JP | 2001-017094 A | 1/2001 | |
| JP | 3076826 U | 4/2001 | |
| JP | 2002-291412 A | 10/2002 | |
| JP | 2002291412 A1 * | 10/2002 | A47J 31/02 |
| JP | 2005-137543 A | 6/2005 | |
| JP | 2010-207113 A | 9/2010 | |
| WO | WO-2004026091 A1 | 4/2004 | |
| WO | WO-2008148834 A1 | 12/2008 | |

OTHER PUBLICATIONS

Extended European Search Report dated May 27, 2014 in EP Application No. 11856398.0.
First Examination Report dated Feb. 20, 2014 in New Zealand Application No. 613677.

* cited by examiner (A)

(B)

(1) Barley (2) Soy beans (3) Toasted tea leaf (4) Toasted tea stem (5) Coffee bean

BEVERAGE EXTRACTION APPARATUS

CROSS REFERENCE TO RELATED APPLICATIONS

This application is the National Stage of International Application No. PCT/JP2011/069071, filed Aug. 24, 2011, and claims benefit of Japanese Application No. 2011-007382, filed on Jan. 17, 2011, all of which are herein incorporated by reference in their entirety.

TECHNICAL FIELD

The present invention relates to a beverage extraction apparatus for obtaining an extracted beverage liquid from a roasted plant raw material by water extraction. For example, the present invention relates to an extracted coffee liquid producing apparatus capable of extracting, for example, flavor ingredients in coffee by discriminating the flavor ingredients from bitter ingredients.

BACKGROUND ART

As beverages such as coffee, barley water and toasted tea, liquids obtained by roasting plant raw materials to be roasted, such as coffee beans, barley for barley water and tea leaves for toasted tea, and by percolating the roasted materials with hot water or the like are habitually consumed by many people. In a roasting process, a chemical reaction is caused by thermal energy in a plant raw material to be roasted to produce a characteristic flavor or taste, e.g., a flavor, good body, a bitter taste, an acidity or a sweet taste. People have an extremely strong taste for a fragrant flavor produced by roasting in particular.

It is difficult to heat pieces of plant raw material to be roasted so that the pieces of material are uniformly heated to their inner portions, and there is a problem such that a scorched taste is produced in the roasting process or the degree of roasting is reduced to limit the amount of scorching; central portions of the pieces of plant raw material to be roasted are half roasted; and bitterness and various undesirable tastes in the resulting percolated liquid are increased. Even in a case where a strong heating condition is set to reduce the roasting time, only surface portions of the pieces of plant raw material to be roasted are baked and central portions of the pieces of raw material are not sufficiently heated uniformly and the resulting percolated liquid is only bitter and wanting in body.

Methods of reducing a scorched smell and bitterness in an extracted beverage liquid obtained by water extraction from a roasted plant raw material have therefore been proposed. They are, for example, a method of producing a good grain tea beverage having a reduced scorched smell and bitterness resulting from roasting and having a strong sweet taste and a good flavor, including a grain cleaning process for removing scorched portions of roasted grain (Patent Literature 1), a method of removing bitterness by removing fine particles existing in an extract liquid, particularly fine particles having a particle diameter of 5 micrometers or more (Patent Literature 2), and the like. Devising an extraction apparatus to remove bitterness and various undesirable tastes has also been proposed. For example, an extraction apparatus loaded with activated carbon having an average pore radius distribution of about 30 to 100 angstroms and capable of selectively adsorbing and removing a polymeric dark brown ingredient such as chlorogenic acid polymer, which is an astringent ingredient in an extracted coffee extract liquid, by means of the activated carbon has been proposed (Patent Literature 3). Coffee extraction apparatuses capable of improving the clarity of an extracted liquid have also been proposed (Patent Literatures 4 and 5).

CITATION LIST

Patent Literature

Patent Literature 1: Japanese Patent Laid-Open No. 2010-207113
Patent Literature 2: Japanese Patent Laid-Open No. 2001-017094
Patent Literature 3: Japanese Patent No. 2578316
Patent Literature 4: Japanese Patent Laid-Open No. 2002-291412
Patent Literature 5: Japanese Utility Model No. 3076826

SUMMARY OF INVENTION

Technical Problem

Reducing bitterness existing as an undesirable ingredient in an extracted liquid (percolated liquid) has conventionally been practiced. However, there is a possibility of failure to sufficiently remove bitterness or a possibility of removing even a rich flavor or taste and body taste specific to a roasted plant simultaneously with removing bitterness, which results in a reduction of the characteristic flavor of a percolated liquid from the roasted plant.

An object of the present invention is to provide a roasted plant extraction apparatus capable of selectively reducing excessive bitterness in an extracted liquid obtained by water extraction from a roasted plant raw material while preserving desirable flavor ingredients and body. For example, the present invention aims to provide a beverage extraction apparatus capable of extracting flavor ingredients in coffee by separating them from excessively strong bitter ingredients.

Solution to Problem

The inventors of the present invention have eagerly made intensive and extensive studies to solve the above-described problem and have found that partition walls in a porous structure of a roasted plant formed by a roasting process have a specifically high affinity for excessively strong bitter ingredients, and that excessively strong bitter ingredients existing in an extracted liquid from a roasted plant can be adsorbed and removed in a chromatographic manner by bringing the extracted liquid into contact with the roasted plant body held in a stationary state and having exposed partition wall surfaces. More specifically, the inventors have found that excessively strong bitter ingredients can be separated and extracted by a process in which coffee granules are contained in a granule containing part in a state of being placed in a substantially sealed state by means of a restraining member and are maintained in a stationary state, and in which an extraction solvent is passed through the deposited layer of the coffee granules in a reciprocating manner. The inventors have achieved the present invention based on this finding. That is, the present invention relates to the following.

1. A coffee extraction apparatus comprising a granule containing part adapted to contain coffee granules, a first pouring device for pouring an extraction solvent into the granule containing part from a first direction, and a collecting device for collecting an extracted coffee liquid extracted by means of the extraction solvent, wherein the granule containing part comprises a detachable restraining member for placing the coffee granules in a substantially sealed state.

2. The coffee extraction apparatus described in 1, further comprising a second pouring device for pouring the extraction solvent into the granule containing part from a second direction opposite to the first direction.

3. The coffee extraction apparatus described in 1 or 2, wherein the granule containing part has such a shape that the coffee granules can be contained therein in a state of being deposited in generally rectangular form as seen in a section in an axial direction.

4. The coffee extraction apparatus described in any one of 1 to 3, wherein the restraining member is a mesh member.

5. The coffee extraction apparatus described in any one of 1 to 4, further comprising a flow controller for controlling a flow of a liquid flowing in the granule containing part.

The present invention further relates to the following.

1. A coffee extraction apparatus comprising a granule containing part adapted to contain coffee granules, a pouring device for pouring an extraction solvent into the granule containing part from a first direction, and a collecting device for collecting an extracted coffee liquid extracted by means of the extraction solvent, wherein the granule containing part comprises a detachable restraining member for placing the coffee granules in a substantially sealed state, and wherein the coffee extraction apparatus further comprises a rotary mechanism for rotating the granule containing part.

2. The coffee extraction apparatus described in 1, wherein the granule containing part has such a shape that the granules can be contained therein in a state of being deposited in generally rectangular form as seen in a section in an axial direction.

3. The coffee extraction apparatus described in 1 or 2, wherein the restraining member is a mesh member.

4. The coffee extraction apparatus described in any one of 1 to 3, wherein the pouring device comprises a single conduit channel having an opening that is open to an upper portion of the granule containing part.

5. The coffee extraction apparatus described in any one of 1 to 4, wherein the granule containing part comprises an upper opening and a lower opening through which the extraction solvent is poured.

6. The coffee extraction apparatus described in any one of 1 to 5, wherein the granule containing part comprises a hold mechanism for holding a layer of the granules and the restraining member in a predetermined position in the granule containing part.

7. The coffee extraction apparatus described in any one of 1 to 6, wherein the layer of the granules and the restraining member form a disposable unit.

8. The coffee extraction apparatus described in any one of 1 to 6, wherein the granule containing part forms a disposable cartridge.

9. The coffee extraction apparatus described in any one of 1 to 8, further comprising an opening/closing mechanism for opening/closing the upper opening and the lower opening.

10. The coffee extraction apparatus described in 8, wherein the disposable cartridge is formed in a capsule-like form that is entirely closed, wherein the pouring device comprises a needle-like end portion capable of piercing an upper end wall and a lower end wall of the disposable cartridge, and wherein the upper opening and the lower opening are formed by the needle-like end portion.

11. The coffee extraction apparatus described in any one of 1 to 10, wherein the granule containing part comprises a discharge facilitating mechanism for facilitating discharge of the extracted liquid.

12. The coffee extraction apparatus described in any one of 1 to 11, wherein the pouring device is capable of performing a first pouring process and a second pouring process for pouring the extraction solvent.

13. A coffee extraction apparatus comprising a granule containing part adapted to contain coffee granules, the granule containing part comprising:

a detachable restraining member for placing the coffee granules in a substantially sealed state; and an upper opening and a lower opening, an upper lid member and a lower lid member being respectively attached detachably to the upper opening and the lower opening, and the upper lid member being provided with a valve including a valve body capable of being moved by the action of gravity.

14. A coffee extraction apparatus comprises a granule containing part adapted to contain coffee granules, a pouring device for pouring an extraction solvent into the granule containing part from a first direction, and a collecting device for collecting an extracted coffee liquid extracted by means of the extraction solvent, wherein the granule containing part comprises a detachable restraining member for placing the coffee granules in a substantially sealed state, and wherein the granule containing part includes an upper opening and a lower opening, wherein an upper lid member and a lower lid member are respectively attached detachably to the upper opening and the lower opening; and wherein the upper lid member and the lower lid member respectively have openings capable of communicating with the upper opening and the lower opening.

15. The coffee extraction apparatus described in 14, wherein the pouring device is capable of performing a first pouring process and a second pouring process for pouring the extraction solvent.

16. A beverage extraction apparatus comprising a granule containing part adapted to contain granules for extraction of a beverage, a pouring device for pouring an extraction solvent into the granule containing part from a first direction, and a collecting device for collecting an extracted liquid extracted by means of the extraction solvent, wherein the granule containing part comprises a detachable restraining member for placing the granules in a substantially sealed state, and wherein the beverage extraction apparatus further comprises a rotary mechanism for rotating the granule containing part.

17. The beverage extraction apparatus described in 16, wherein the granule containing part has such a shape that the granules can be contained therein in a state of being deposited in generally rectangular form as seen in a section in an axial direction.

18. The beverage extraction apparatus described in 16 or 17, wherein the restraining member is a mesh member.

19. The beverage extraction apparatus described in any one of 16 to 18, wherein the pouring device comprises a single conduit channel having an opening that is open to an upper portion of the granule containing part.

20. The beverage extraction apparatus described in any one of 16 to 19, wherein the granule containing part comprises an upper opening and a lower opening through which the extraction solvent is poured.

21. The beverage extraction apparatus described in any one of 16 to 20, wherein the granule containing part comprises a hold mechanism for holding a layer of the granules and the restraining member in a predetermined position within the granule containing part.

22. The beverage extraction apparatus described in any one of 16 to 21, wherein a layer of the granules and the restraining member form a disposable unit.

23. The beverage extraction apparatus described in any one of 16 to 21, wherein the granule containing part forms a disposable cartridge.

24. The beverage extraction apparatus described in any one of 16 to 23, further comprising an opening/closing mechanism for opening/closing the upper opening and the lower opening.

25. The beverage extraction apparatus described in 23, wherein the disposable cartridge is formed in a capsule-like form that is entirely closed, wherein the pouring device comprises a needle-like end portion capable of piercing an upper end wall and a lower end wall of the disposable cartridge, and wherein the upper opening and the lower opening are formed by the needle-like end portion.

26. The beverage extraction apparatus described in any one of 16 to 25, wherein the granule containing part comprises a discharge facilitating mechanism for facilitating discharge of the extract liquid.

27. The beverage extraction apparatus described in any one of 16 to 26, wherein the pouring device is capable of performing a first pouring process and a second pouring process for pouring the extraction solvent.

28. A beverage extraction apparatus comprising a granule containing part adapted to contain granules for extraction of a beverage, the granule containing part comprising:

a detachable restraining member for placing the granules in a substantially sealed state; and an upper opening and a lower opening, an upper lid member and a lower lid member being respectively attached detachably to the upper opening and the lower opening, and the upper lid member being provided with a valve including a valve body capable of being moved by the action of gravity.

29. A beverage extraction apparatus comprising a granule containing part adapted to contain granules for extraction of a beverage, a pouring device for pouring an extraction solvent into the granule containing part from a first direction, and a collecting device for collecting an extract liquid extracted by means of the extraction solvent, wherein the granule containing part comprises a detachable restraining member for placing the granules in a substantially sealed state, and wherein the granule containing part comprises an upper opening and a lower opening, wherein an upper lid member and a lower lid member are respectively attached detachably to the upper opening and the lower opening; and wherein the upper lid member and the lower lid member respectively have openings capable of communicating with the upper opening and the lower opening.

30. The beverage extraction apparatus described in 29, wherein the pouring device is capable of performing a first pouring process and a second pouring process for pouring the extraction solvent.

Advantageous Effects of Invention

By use of the beverage extraction apparatus of the present invention, a roasted plant extracted liquid of extremely good flavor in which only excessive bitterness is reduced while the flavor and body taste are maintained can be easily obtained. For example, in a case where the beverage extraction apparatus of the present invention is a coffee extraction apparatus, excessively strong bitter ingredients in coffee can be selectively separated and extracted and an extracted coffee liquid of extremely good flavor can be easily obtained.

By use of the beverage extraction apparatus of the present invention, it is possible to obtain a beverage which is conventionally not available, specifically, a beverage that leaves a clear aftertaste and makes individual characters of a roasted plant sensible, even when it has a concentration equal to or higher than that of tea or coffee strongly made in the conventional way (so-called espresso or the like). The extraction apparatus of the present invention also removes particulates and therefore has the advantage of reducing various undesirable tastes, having extremely high clarity and high preservation stability.

DESCRIPTION OF EMBODIMENTS

Figure 16:
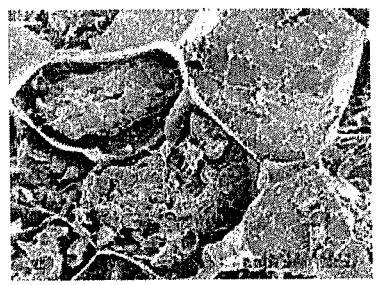
FIG. 16 shows scanning electron microscopic photograph (SEM) images of a grain (barley), a bean (soy bean), teas (toasted tea leaf, toasted tea stem) and a seed (coffee bean).
Figure 16:
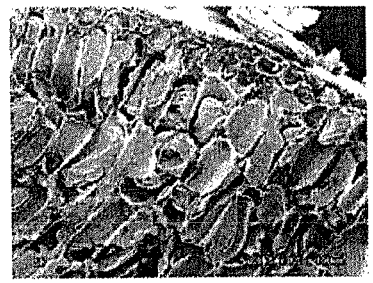
Figure 16:
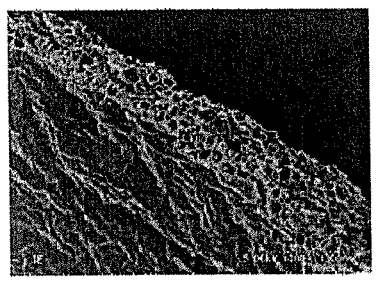
Figure 16:
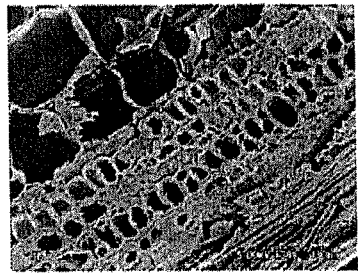
Figure 16:
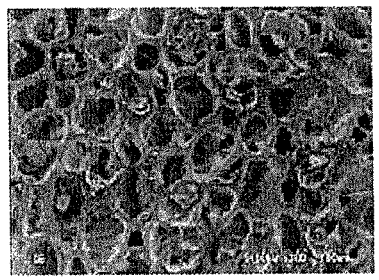

A roasted plant referred to in the description of the present invention is a plant having its water content removed by a roasting process and having its internal cell tissues voided thereby to have a porous structure. Plants that may be used according to the present invention are not limited to particular kinds, as long as they are roasted to have a porous structure. More specifically, examples of such plants are grains, such as barley, wheat, rye, oats (*Avena tatua, Avena sativa*), rice plants, corn, millets (including Japanese barnyard millet and Chinese millet), buckwheat and adlay; trees, such as oak, a cherry tree, an Amur cork, a maple tree, a horse chestnut tree, a chestnut tree, a Chinese scholar tree (Japanese pagoda tree), a keyaki (zelkoba tree), a hinoki (Japanese cypress), *cryptomeria japonica*, an umbrella pine (Japanese parasol fir), a bamboo, mizunara (a kind of oak), pine, a hiba arborvitae, bamboo grass, a paulownia, an ume tree (Japanese apricot tree), a peach, a wisteria, a fir, an elm, a ginkgo, a camellia, a willow, a mulberry, a teak, mahogany, a magnolia, a persimmon tree, an apricot, a Chinese quince, a sweet brier, a rose, a loquat, a flowering quince, a fragrant olive, a camphor tree, a yew, an acacia and ukogi (a prickly shrub of the family Araliaceae); teas; beans, such as soy beans, adzuki beans, peas, broad beans and kidney beans; seeds, such as sesame seeds, coffee beans (seeds of a coffee tree) and loquat seeds, and the like, but are not limited to these. Also, portions to be used are not particularly defined. For example, germinated seeds, seeds not yet germinated, seed coats, sprouts, flowers, fruits, stems, leaves, roots and the like can be used. FIG. 16 shows scanning electron microscopic photograph (SEM) images of a grain (barley), a bean (soy bean), teas (toasted tea leaf, toasted tea stem) and a seed (coffee bean). As is apparent from the photographs, the grain, bean, toasted tea stem and coffee bean have porous structures. On the other hand, in the toasted tea leaf, a porous structure appears only in a section. Therefore, the present invention is suitable for extraction from seeds of grain plants, seeds in a fruit such as coffee beans, seeds of bean plants and stems of tea plants in terms of the magnitude of the adsorbing effect of the present invention. Extraction from coffee bean seeds in particular is an example of a preferable mode of the present invention. In the present invention, processing such as pulverization may be performed as long as it is performed within such limits that the porous structure of a roasted plant is not broken. In this specification, a roasted plant or a pulverized pieces of such plant having an average grain size of about 0.1 to 2.0 mm, preferably about 0.5 to 2.0 mm, more preferably about 1.0 to 1.5 mm are expressed as granules for beverage extraction (expressed simply as "granules" in some cases).

It is considered that in each of roasted plants obtained by performing a roasting process on these plants, many ingredients produced during roasting are adsorbed and accumulated in layers in order of production on partition walls in the porous structure formed by roasting, and ingredients of strong bitterness produced at the final stage of roasting in particular are adsorbed to the outermost surfaces of the partition walls. The beverage extraction apparatus of the present invention is an apparatus using a porous structure of a roasted plant as a column (stationary phase) and capable of capturing and separating excessively strong bitter ingredients in a chromatographic manner. That is, the apparatus temporarily desorbs ingredients adsorbed to the partition walls in the porous structure of a roasted plant by passing an aqueous solvent so that the partition wall surfaces are exposed, and passes, through this, an extracted liquid obtained by water extraction from the roasted plant raw material. The apparatus can selectively adsorb and remove excessively strong bitter ingredients in the extracted liquid in this way.

To smoothly and effectively perform this desorption of ingredients on the partition wall surfaces and readsorption of the bitter ingredients without requiring any complicated operation, the apparatus of the present invention employs a method of passing the extraction solvent through the layer of the granules for beverage extraction packed (fixed) in a substantially sealed state so that the extraction solvent reciprocates through the granule layer. When a small amount of the extraction solvent is first brought into contact with the granules (going passage), aroma ingredients, taste ingredients (water-soluble taste component, bitter ingredients) adsorbed to the surface of the porous structure are temporarily desorbed to expose the partition wall surfaces of the porous structure. The extraction solvent containing these desorbed components is brought into contact with the granules having the porous structure surfaces exposed, thereby selectively readsorbing only the bitter ingredients in the extraction solvent. "Reciprocating movement of an extraction solvent" referred to in this specification means that an extraction solvent flows by reciprocating, for example, in the direction of gravity or a horizontal direction through a deposited layer of granules, i.e., the extraction solvent flows in one direction and subsequently flows in the opposite direction. For example, in a case where an extraction solvent introduced to desorb ingredients adsorbed to a porous structure flows in a direction opposite to the direction of gravity through the granule layer, and an obtained extract liquid from roasted bean surfaces flows in the direction of gravity, such a flow of water (extraction solvent) is referred to as "reciprocating movement of an extraction solvent".

To carry out such reciprocating movement of an extraction solvent through a deposited granule layer with improved reproducibility while the space therefor is restricted, the apparatus of the present invention comprises a restraining member for placing the granules in a substantially sealed state and a rotary mechanism for rotating the granule containing part. The restraining member for placing granules in a substantially sealed state is a component necessary for using, as an adsorbent, a roasted plant (extraction residue) having porous structure partition wall surfaces exposed. As the restraining member, a member capable of holding the extraction residue in a substantially sealed state, e.g., a member in plate-like form (retaining plate) inscribed in an extraction section or a member in sack-like form (retaining sack) can be mentioned. "Substantially sealed" referred to in this specification refers to a state in which granules do not move in the granule containing part at the time of supply of an extraction solvent and/or collection of an extract liquid.

In the case of drip extraction with the conventional coffee extraction apparatus, coffee granules can float close to the liquid surface and move along the extraction solvent pouring path. In the case of extraction by the immersion method, coffee granules can float close to the liquid surface and can be flowed largely by free convection or agitation. In the apparatus of the present invention, the restraining member is placed in a position in contact with or a position close to the uppermost surface of granules for beverage extraction, and in such a position as to be in contact with the lowermost surface of the granules, thereby holding the granules in a substantially sealed state so that the granules do not move during extraction. Preventing the granules from moving enables readsorption of excessively strong bitter ingredients to the exposed partition walls in the porous structure. "A position close to the uppermost surface of granules" herein refers to a position which is spaced apart from the uppermost surface of the deposited layer of the granules for beverage extraction by an amount (gap) by which the granules swell naturally when wetted with the extraction solvent. More specifically, such a position is defined within a region from a position at which the granules are slightly compressed (about 0.9 times the volume of the granules) to a position corresponding to about 2 times (preferably about 1.5 times) the volume of the granules, by taking into consideration the swelling of the granules after bringing into contact with the extraction solvent.

The kind of material for the restraining member and the shape of the restraining member are not particularly limited. More specifically, a mesh member, such as metal mesh, nonwoven fabric (flannel, lint or the like) or a paper filter, having a flat shape, a conical shape, a pyramidal shape, a sack-like shape, or the like can be used. If the mesh size of the mesh member is excessively small, clogging occurs easily, the time required for extraction is increased and there is a possibility of over-extraction. It is, therefore, preferable to use a mesh member having a mesh size of about American mesh 20 to 200 if the mesh member is metal mesh. In the case of using a mesh member, a peripheral portion of the mesh member may be formed from an elastic material (e.g., nonwoven fabric such as cotton flannel) and the restraining member may be brought into pressure contact with the inner surface of the granule container part to enhance the restraining function.

The rotary mechanism for rotating the granule containing part according to the present invention is a mechanism for inverting the granule containing part (in other words, rotating the granule containing part through 180 degrees in a vertical direction) so that the extract liquid is collected at the same side of the layer of granules as the side at which the extraction solvent is poured. This rotary mechanism enables passing the liquid so that the extraction solvent reciprocates in the layer of the granules for beverage extraction packed (fixed) in a substantially sealed state. The rotary mechanism may be manually or automatically operated. Also, the direction of rotation may be such that vertical rotation in the direction of gravity or vertical rotation in a horizontal direction suffices as long as the granule containing part is inverted. Terms such as "above", "below", "upper" and "lower" indicating directions with respect to the granule containing part in this specification denote directions before the extraction apparatus is operated (in other words, before rotation of the granule containing part), unless otherwise specified. "Upper" designates a portion above a central portion of the granule container part as seen in the vertical direction, and does not necessarily designate only the upper end. Similarly, "lower" designates a portion below a central portion of the granule container part as seen in the vertical direction, and does not necessarily designates only the lower end.

In the apparatus of the present invention, granules for extraction of a beverage are first set in the granule containing part in a substantially sealed state by using the restraining member. An operation to place the granules on the upper surface of the restraining member mounted in a lower portion of the granule containing part (at a position for contact) is performed and the restraining member is set in such a position as to be brought into contact with or close to the granules. Even in a case where the apparatus of the present invention is of an electrically powered automatic type, this operation is an operation to be performed by an operator before activating the apparatus of the present invention. It should be noted that, as described later, an operation to set in the granule containing part a disposable unit in which the granules and the restraining member are combined integrally with each other or an operation to mount in the apparatus a granule containing part constructed as a disposable cartridge in which the granules and the restraining members are set in advance is included in the operation to be performed by an operator before activating the apparatus of the present invention.

It is preferable that the granule containing part adapted to contain the granules for extraction of a beverage have a shape substantially uniform in inside diameter along the direction of the advance movement of the extraction solvent in order to efficiently and effectively perform desorption of surface ingredients of the granules for beverage extraction and readsorption of bitter ingredients to the partition wall surfaces thereof, which desorption and readsorption are important in the present invention. "The shape substantially uniform in inside diameter" means that the sectional shape of the deposited layer of granules in the axial direction is generally rectangular, that is, the shape is such that the granules can be contained by being deposited in cylindrical or rectangular block form (including cubic form).

In particular, the present invention utilizes an extraction residue as an adsorbent. In making full use of the adsorption effect, the shape of the extraction section in the granule containing part (the relationship between the sectional area and the height) is important. In this specification, a region in the granule containing part where the granules are placed in a substantially sealed state by means of the restraining member is represented as an extraction section. It is desirable to design the shape of the extraction section so that, in the generally rectangular sectional shape of the extraction section along the axial direction, the ratio (H/L) of the width (L) and the height (H) of the rectangle is within a range from 0.1 to 10, preferably from 2 to 6, more preferably from 3 to 6, depending on characteristics including the grain size of the granules. When the ratio exceeds this range, the time required for extraction may become long and clogging may occur and, hence, over-extraction (a phenomenon in which harsh, pungent and astringent tastes and other various undesirable tastes in the granules are extracted due to excessive contact between the extraction solvent and the granules) may occur. When the ratio is below the above-described range, the sufficiently high adsorption effect expected of the device of the present invention cannot be obtained.

In the apparatus of the present invention, after placing granules in a substantially sealed state in the granule containing part by using the above-described restraining member, the extraction solvent is injected into the granule containing part from the first direction by the pouring means.

The first direction from which the extraction solvent is poured may be a position above or below the granule containing part. However, it is necessary to provide the pouring device and the collecting device so that the extraction solvent can reciprocate in the deposited layer of the granule. That is, if the liquid is passed from above to below the deposited layer (downward flow), it is necessary to perform collection such that the extract liquid flows from below to above (upward flow) in terms of the positional relationship of the deposited layer before rotation. To realize this, in a case where the extraction solvent is poured into the granule containing part from an upper portion before rotation (downward flow), a discharging port should be provided in the upper portion of the granule containing part (that is, a port that functions as a pouring port and also as a discharging port should be provided in the upper portion of the granule containing part), which, after vertical inversion of the granule containing part with the rotary mechanism, enables the extract liquid to flow from above to below in the deposited layer after rotation (downward flow). From the viewpoint of facilitating collection, it is preferable to select a direction from an upper portion of the granule containing part as the first direction of the present invention.

Initial pouring of the extraction solvent (first pouring) is for temporarily desorbing ingredients adsorbed to partition walls in the porous structure of a roasted plant (aromatic ingredients and taste ingredients produced mainly at the time of roasting) so that the surfaces of the partition walls in the porous structure are exposed, i.e., preparing for efficiently separating bitter ingredients by using the granules as adsorbent. Therefore, an amount of the extraction solvent sufficient for temporarily desorbing the ingredients adsorbed to the partition walls in the porous structure may suffice in the first pouring. More specifically, an amount of the extraction solvent about 0.3 to 2 times, preferably about 0.5 to 1.5 times the volume of the granules is poured. More preferably, an amount of the extraction solvent is poured such that the extraction solvent can substantially reach the upper surface of the deposited layer of the granules. By using a small amount of extraction solvent in the first pouring, an extracted liquid rich in aroma and taste ingredients from the roasted plant surface can be obtained. If an amount of the extraction solvent above the above-described range is poured, there is a possibility of a reduction in the efficiency of separation in the bitter ingredient adsorption step thereafter performed, or extraction of undesirable tastes from inner portions of the roasted plant, which causes degradation in flavor of the extract liquid. The amount of the extraction solvent poured may be controlled by providing a liquid amount meter in the granule containing part and/or the extraction solvent tank and measuring the amount of the extraction solvent poured or flowing out. A liquid level meter may alternatively be provided in the granule containing part to control the amount of the extraction solvent by measuring the level of the liquid surface.

Desorption of ingredients adsorbed to the granules can be effectively performed by passing an amount of the extraction solvent in the above-described range through the granule containing part at a space velocity (SV) of about 3 to 100. The liquid passage rate is set preferably to SV=5 to 70, more preferably to about 5 to 50, further preferably to about 6 to 40. It is preferable to provide a flow controller in the apparatus of the present invention in order to control the flow velocity to a liquid passage rate in this range.

When the extraction solvent is injected into the extraction section, air bubbles enclosed in the granules are released in the extraction section to exist as air bubbles. These air bubbles may impede injection of the extraction solvent. It is, therefore, preferable to provide deaeration means in the granule containing part in advance. The deaeration means may be, for example, a device for producing a negative pressure in the granule containing part or a device for applying fine vibrations. A device for applying fine vibrations is especially preferred for maintaining aroma ingredients in the extract liquid as desired.

In the apparatus of the present invention, pouring of the extraction solvent is temporarily stopped after the first pouring, and the granule containing part is vertically inverted by the rotary mechanism, which is a feature of the present invention. Thereafter, pouring of the extraction solvent is again started (second pouring) and the extract liquid is collected by the collecting device. During the second pouring, the extract liquid obtained by the first pouring can be collected by being pushed by the extraction solvent supplied by the second pouring (water drive). Also, good flavor ingredients contained in the extraction residue can be extracted and collected.

Collection of the extract liquid is performed while adsorbing and removing bitter ingredients in the extract liquid obtained by the first extraction. In efficiently performing adsorption, the liquid passage speed in the second pouring is important. More specifically, the speed of passage of the extraction solvent through the granule layer, i.e., the speed of discharge of the liquid to be collected, is preferably about 3 to 100, more preferably 5 to 70, further preferably 5 to 50, most preferably 6 to 40 in terms of space velocity (SV).

In general, as undesirable ingredients in a roasted plant extracted liquid, astringent ingredients that are eluted from inner portions of the granules as the extraction process progresses from the middle stage to the last stage and that stay on the tongue exist as well as excessively strong bitter ingredients (scorched bitters) adsorbed to the partition wall outermost surfaces. In the second pouring, therefore, the extraction is controlled so that such astringent ingredients eluted from the middle stage to the last stage of extraction and staying on the tongue are not collected, thus enabling efficient extraction of an extracted liquid with improved flavor. More specifically, it is preferable that the amount of the extract liquid to be collected by means of the collecting device is about 0.5 to 5 times, preferably 1 to 3 times, more preferably 1 to 2 times the volume of the granules. If an amount of the extracted liquid exceeds 5 times the volume of the granules, an astringent ingredient in the extracted liquid can be perceived. The amount of the extraction solvent in the second pouring may also be controlled with a liquid level meter and/or a liquid amount meter, as is that in the first pouring.

When extraction is performed in this way, the rate of extraction of the extracted liquid is 20% or less, preferably 15% or less. Here, the rate of extraction is a value expressed by the following expression.

$$\text{Coffee extraction rate (\%)} = \{\text{Weight (g) of extracted liquid}\} \times \{\text{Brix (\%) of extract liquid}\} / \{\text{Weight (g) of coffee granules}\}$$

(Brix represents the content of soluble solids measured with a saccharimeter, e.g., Digital Refractometer RX-5000α, manufactured by ATAGO CO., LTD.)

As an example of the apparatus that performs the first pouring and the second pouring as described above, an apparatus in which the granule containing part has an upper opening and a lower opening through which the extraction solvent is poured, and in which, preferably, a single conduit channel having an opening that is open to an upper portion of the granule containing part is provided, can be mentioned.

Also, in the apparatus of the present invention, pouring is temporarily stopped after the first pouring and the second pouring is then started and, preferably, a valve capable of controlling entering and exiting of the extraction solvent is provided at the openings of the granule containing part. This valve may be of a manual type or of a solenoid type. When the apparatus of the present invention is an electrically powered extraction apparatus, it is preferable to provide the valve in such a form as to be automatically controllable as a solenoid valve.

Embodiments

Hereinbelow, with reference to the drawings, the present invention will be described in detail, by taking as an example coffee extraction apparatuses in which coffee granules are used as granules for beverage extraction and in which a coffee extract liquid is collected. However, the present invention is not limited to them. The present invention can be applied to any beverage extraction apparatus for obtaining an extracted liquid for a beverage obtained from a roasted plant as well as to coffee extraction apparatuses.

Figure 1:
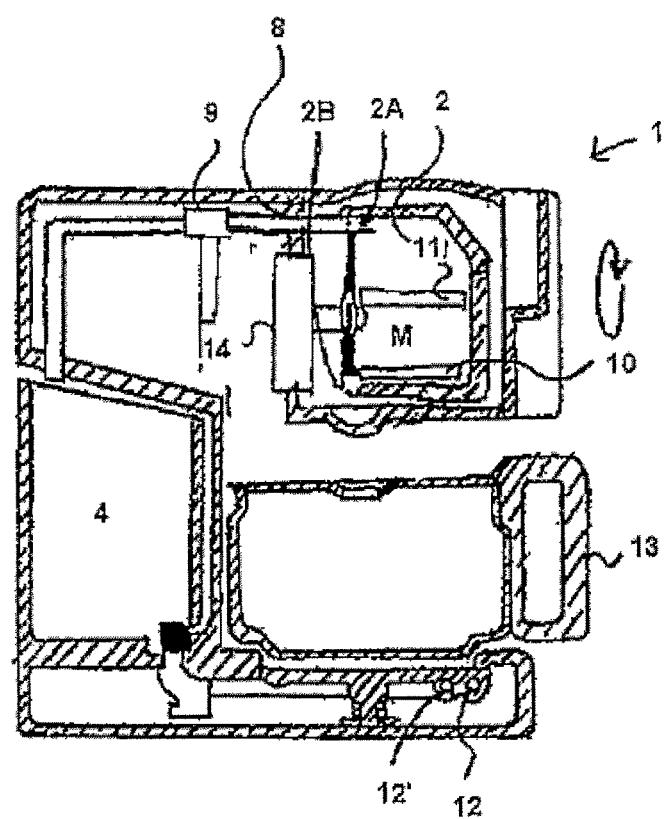
FIG. 1 shows an electrically powered coffee extraction apparatus according to an embodiment of the present invention.

FIG. 1 shows an example of an electrically powered coffee maker (coffee extraction apparatus 1). In the coffee extraction apparatus shown in FIG. 1, the "first direction" according to the present invention corresponds to a direction toward a position below a granule containing part 2 (the direction toward 2B in FIG. 1). In an extraction apparatus 1 body, a water tank 4 for storing water to be used by a user to extract coffee and a bean storage chamber (granule containing part 2) for setting coffee granules therein by a user are provided. The granule containing part 2 is cylindrical in shape and has an upper opening 2A formed at its upper end, a lower opening 2B (pouring port) formed at its lower end, and an opening/closing mechanism provided at the lower opening 2B. Retaining plates (metal filters) 10 and 11 as restraining members for packing coffee granules in a substantially sealed state, are detachably mounted inside the granule containing part.

When a user uses this apparatus, he/she first sets the restraining member 10 in the granule containing part 2, packs coffee granules M on the upper surface of the restraining member 10, and places the restraining member 11 for restraining the coffee granules M from flowing in a position such that the restraining member 11 is brought into contact with or close to the upper surface of the deposition surface. At this time, the lower opening 2B is in a closed state. Subsequently, the apparatus of the present invention is activated. Water stored in the water tank 4 is heated by being led into a heating pipe 12' integral with a heater 12 to become hot water, and a solenoid valve 9 is opened to supply the hot water from a conduit channel 8 into the granule containing part 2. A predetermined amount of hot water is supplied from the conduit channel 8 into the granule containing part 2 through the upper opening (pouring port) 2A of the granule containing part (first pouring). In the first pouring, the apparatus is controlled by a flow controller so that the liquid passage rate is within a preferable range (SV=about 3 to about 100).

After the predetermined amount of hot water has passed through the solenoid valve 9 in the first pouring, the solenoid valve 9 is automatically closed to temporarily stop pouring. Subsequently to closing of the solenoid valve 9, a motor of a controller provided in this apparatus is started to rotate a rotary mechanism 14. The rotary mechanism 14 is attached to a side portion of the granule containing part. The granule containing part 2 is turned upside down by the rotary mechanism 14 (that is, the pouring port 2B is brought into an upper position in the axial direction (in other words, the height direction of the granule containing part 2) while the pouring port 2A is brought into a lower position in the axial direction). When the granule containing part 2 is turned upside down, the opening 2B of the granular containing part is opened, the solenoid valve 9 is automatically opened, and a predetermined amount of hot water is again supplied from the conduit channel 8 into the granule containing part 2 through the pouring port 2B (second pouring). Thus, the coffee extraction apparatus 1 has the single conduit channel 8 that is used for the first pouring and the second pouring and that opens into an upper portion of the granule containing part. In the second pouring, the apparatus is controlled by the flow controller so that the liquid passage rate is within a preferable range (SV=about 3 to about 100).

In the first pouring, the extraction solvent (hot water) flows in a direction from the opening 2A to the opening 2B of the granule containing part. In the second pouring, the extraction solvent (hot water) flows in a direction from the opening 2B to the opening 2A. That is, the granule containing part 2 is inverted and the predetermined amount of the extraction solvent (hot water) is supplied from the opening 2B. Thus, the extraction solvent flows in the granule layer in a reciprocating manner. An extract liquid from the roasted plant is discharged from the opening 2A of the granule containing part through a discharging port and stored in a storage container 13. The extract liquid in the storage container 13 is kept warm by the heater 12.

FIGS. 2 to 9 illustrate other embodiments of the electrically powered coffee maker (coffee extraction apparatus) according to the present invention. In a coffee extraction apparatus 1' shown in FIG. 2, water stored in a water tank 4 is heated by being led into a heating pipe 12' integral with a heater 12 to become hot water, which is supplied as an extraction solvent from a conduit channel 8' into a granule containing part 102, as in the coffee extraction apparatus 1 shown in FIG. 1. A coffee extract liquid after the extraction process is accumulated in a storage container 13 and is kept warm by the heater 12. The coffee extraction apparatus 1' also includes a rotary mechanism 14 for rotating the granule containing part 102, as does the apparatus shown in FIG. 1. A rotary shaft 14A of the rotary mechanism 14 is attached to a side portion of the granule containing part 102, as illustrated.

Figure 2:
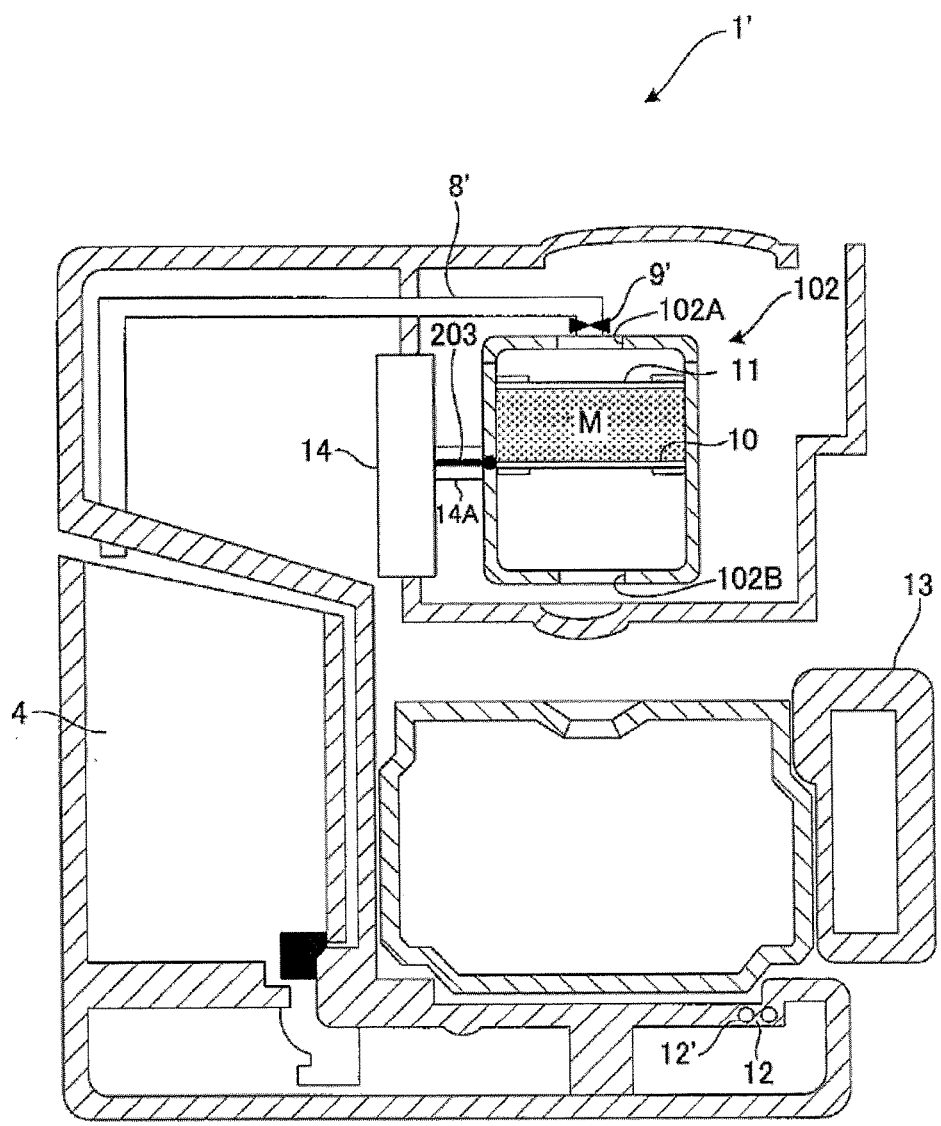
FIG. 2 shows an electrically powered coffee extraction apparatus according to an embodiment of the present invention.

In the example shown in FIG. 2, an extraction solvent supply port positioned at a distal end of the single conduit channel 8' is provided so as to be open to an upper portion of the granule containing part 102, and the granule containing part 102 has an upper opening 102A and a lower opening 102B through which the extraction solvent is supplied. Rotation of the granule containing part 102 described later enables the conduit channel 8' to function as first pouring device for pouring the extraction solvent from the first direction described with respect to the above-described embodiment into the granule containing part and also to function as second pouring device for pouring the extraction solvent into the granule containing part.

Figure 3:
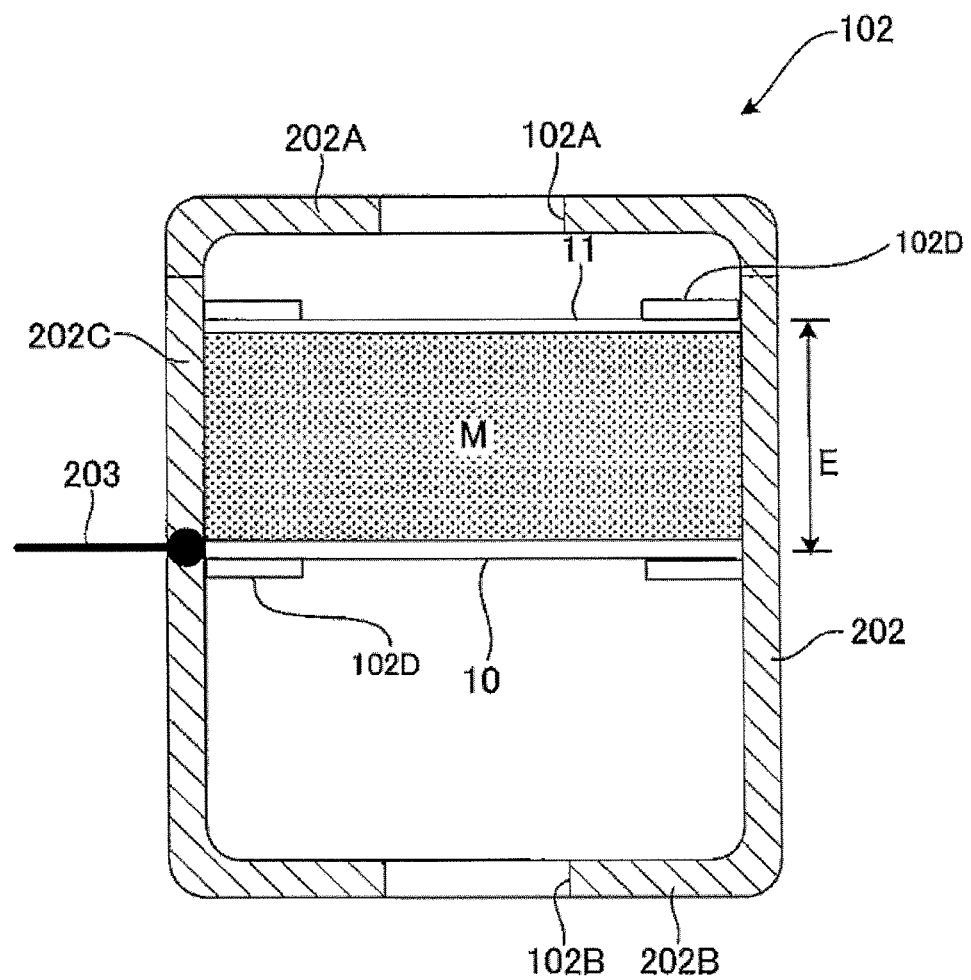
FIG. 3 shows a schematic sectional side view of the granule containing part shown in FIG. 2.

FIG. 3 shows a schematic sectional side view of the granule containing part 102. The rotary shaft 14A of the rotary mechanism 14 attached to a side portion of the granule containing part 102 is not shown. In the present embodiment, the granule containing part 102 may be formed integrally with the rotary shaft 14A of the rotary mechanism 14 or may have an attachment portion detachably attached to the rotary shaft 14A of the rotary mechanism 14. In the illustrated embodiment, the granule containing part 102 has an attachment portion. More specifically, a shaft 203 capable of being fixed to the rotary shaft 14A of the rotary mechanism 14 is provided as attachment portion on a side wall 202C of a body 202 of the granule containing part 102. For example, the shaft 203 is formed as a solid shaft and can be fixed to the rotary mechanism 14 by being tightly fitted into the rotary shaft 14A of the rotary mechanism 14, which is formed as a hollow shaft. As a result, turning the granule containing part 102 upside down by rotating the rotary mechanism 14 is enabled. The arrangement may alternatively be such that the shaft 203 is formed as a hollow shaft while the rotary shaft 14A of the rotary mechanism 14 is formed as a solid shaft.

The attachment portion for detachably attaching the granule containing part 102 to the rotary mechanism 14 is not limited to a shaft such as the shaft 203. An attachment portion may be provided on the rotary mechanism 14 instead of being provided on the granule containing part 102.

The granule containing part 102 adapted to contain a layer of coffee granules M, a restraining member (first filter member) for holding the layer of granules M in a substantially sealed state (a filter member provided in a lower position as viewed in FIG. 3 such as to be inscribed in the granule containing part 102) 10 and a second filter member (restraining member) (a filter member provided in a position above the first filter member 10 such as to be inscribed in the granule containing part 102) 11, as does the granule containing part 2 in the above-described embodiment. "Substantially sealed" means a state where coffee granules M do not move in a leaping manner when the extraction solvent is passed. In the present embodiment, it means a state where the layer of coffee granules M is surrounded by a side wall 202C of the granule containing part 102 and the first and second filter members 10 and 11 in the granule containing part 102.

In the present embodiment, the granule containing part 102 comprises a hold mechanism 102D for holding the first filter member 10, the layer of coffee granules M and the second filter member 11 in a state of being integral with each other in a predetermined position in the granule containing part 102. The hold mechanism 102D is, for example, a pair of members in annular plate form fixed to the side wall 202C of the granule containing part 102. The first filter member 10, the layer of granules M and the second filter member 11 are held in a region (referred to as "extraction section E") between these members in annular plate form. The position of the hold mechanism 102D is not particularly limited. However, it is preferable to determine the position of the hold mechanism 102D so that the extraction section E (i.e., the first filter member 10, the layer of granules M and the second filter member 11) is positioned in an upper portion of the granule containing part 102 before rotation. With this arrangement, a sufficient amount of the coffee extract liquid caused to reciprocate in the layer of the granules M by the rotation of the granule containing part 102 and water drive, can be secured. Accordingly, the entire extraction section E may not necessarily be positioned in the upper portion of the granule containing part 102. Preferably, at least a half or more of the extraction section E is positioned in the upper portion of the granule containing part 102. The extraction section E, however, may occupy substantially the entire internal space of the granule containing part 102. In such a case, the hold mechanism 102D may not be necessarily provided.

In the example shown in FIG. 3, the granule containing part 102 has the substantially cylindrical body 202 having an upper end wall 202A, a lower end wall 202B and the side wall 202C. It is preferable to make the shape of the body 202 substantially uniform in inside diameter along the direction of onward movement of the coffee extract liquid in order to immobilize coffee granules M and facilitate readsorption of bitter ingredients. "The shape substantially uniform in inside diameter" means that the sectional shape of the deposited layer of coffee granules M in the axial direction is generally circular or generally rectangular, that is, the shape is such that the coffee granules M can be contained by being deposited in cylindrical or rectangular block form (including cubic form). Accordingly, the shape of the body 202 is not limited to a cylindrical shape such as described above. Also, in order to remove bitter ingredients in a chromatographic manner by making the extraction solvent to sufficiently reciprocate in the layer of granules M, in a case where the body 202 has, for example, a cylindrical shape, it is preferable to design the shape of the layer of granules M so that, in the generally rectangular sectional shape of the granule layer in the axial direction, the ratio (H/L) of the width (L) and the height (H) of the rectangle is within a range from 0.1 to 10 (preferably from 2 to 6, more preferably from 3 to 6).

Figure 11:
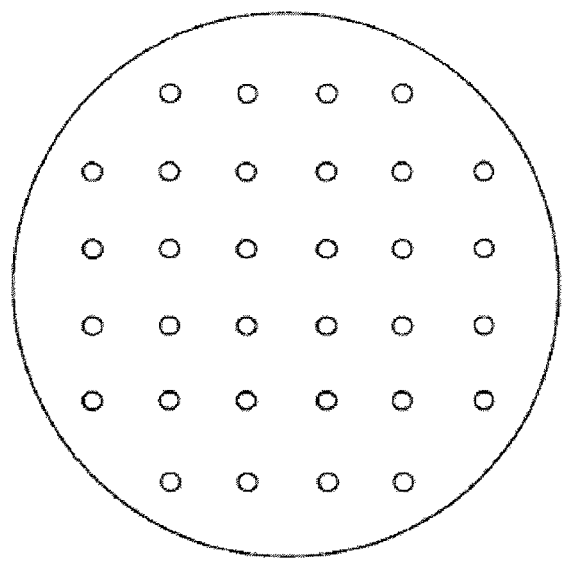
FIG. 11 is a plan view showing an example of a dispersion plate.
Figure 11:
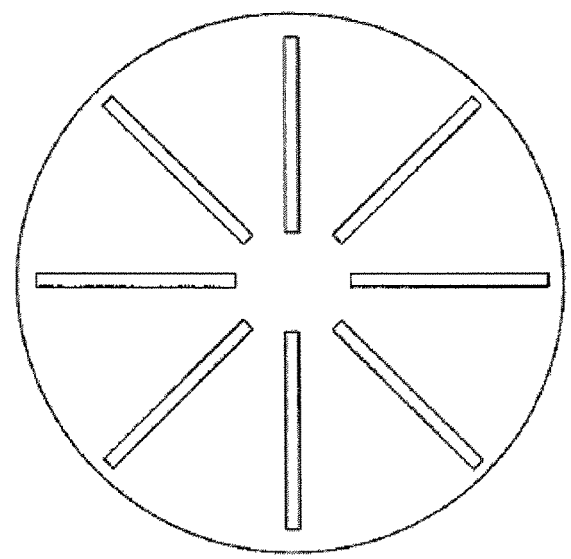

The kind of material for the first and second filter members 10 and 11 and the shape or the like of the filter members are not particularly limited as long as they are capable of holding coffee granules M in a substantially sealed state, capable of being inscribed in the body 202, capable of allowing the extraction solvent and the extract liquid to pass therethrough and capable of preventing coffee granules M from falling and mixing in the coffee extract liquid. In this respect, the first and second filter members 10 and 11 can function in the same manner as the restraining members in the above-described embodiment. More specifically, each of the first and second filter members 10 and 11 may be a mesh member, such as metal mesh, nonwoven fabric (flannel, lint or the like) or a paper filter. If the mesh size of the filter member is excessively small, clogging occurs easily, the time required for extraction is increased and there is a possibility of over-extraction. It is, therefore, preferable to use a mesh member having a mesh size of about American mesh 20 to 200 if the mesh member is metal mesh. From the viewpoint of enabling adsorption and removal of oil ingredients in the coffee extract liquid, it is preferable to use nonwoven fabric. The first filter member 10, the layer of granules M and the second filter member 11 may be combined integrally with each other to form a disposable unit, as described later. In such a case, the first filter member 10 and the second filter member 11 may be connected to each other around the layer of granules M, or the entire layer of granules M may be covered with a single filter member in sack-like form, which is not divided into the first filter member 10 and the second filter member 11. To enable the extraction solvent and the extract liquid to be extracted with efficiency by being uniformly passed through the extraction section E without causing over-extraction, the outer surface each of the first filter member 10 and the second filter member 11 may be covered with a dispersion plate having a plurality of openings formed therein as shown in FIG. 11.

In the present embodiment, the layer of granules M, the first filter member 10 and the second filter member 11 in combination can form a disposable unit, or the entire granule containing part 102 containing the layer of granules M, the first filter member 10 and the second filter member 11 can form a disposable cartridge. For attachment/detachment of the disposable unit on the body 202 of the granule containing part 102, in the case where the layer of granules M, the first filter member 10 and the second filter member 11 in combination form the disposable unit, the upper end wall 202A of the granule containing part 102, for example, can be formed so as to be detachable as a top lid. In the case where the granule containing part 102 itself forms the disposable cartridge, an attachment portion such as the above-described shaft 203 is required to detachably attach the granule containing part 102 to the rotary mechanism 14.

The rotary mechanism 14 can invert the granule containing part 102 (in other words, rotate the granule containing part 102 through 180 degrees in the vertical direction as viewed in FIG. 2) so that the extract liquid is collected at the same side of the layer of granules M as the side at which the extraction solvent is poured.

As shown in FIG. 3, the granule containing part 102 has the upper opening 102A and the lower opening 102B which are positioned in the upper end wall 202A and the lower end wall 202B such that the upper opening 102A and the lower opening 102B face each other. Before the coffee extraction apparatus 1' is operated (in other words, before the granule containing part 102 is inverted), the upper opening 102A is positioned so as to directly face the supply port of the conduit channel 8' and functions as a pouring port through which the extraction solvent is poured from the conduit channel 8'. After inversion, the lower opening 102B directly faces the supply port of the conduit channel 8' and functions as a pouring port through which the extraction solvent is poured from the conduit channel 8'. Discharge of the coffee extract liquid is performed through the upper opening 102A positioned in the lower portion of the granule containing part 102 after inversion. Thus, in the illustrated example, the upper opening 102A functions as a port for pouring of the extraction solvent and as a port for discharge of the extract liquid, while the lower opening 102B functions only as a port for pouring of the extraction solvent.

Figure 4:
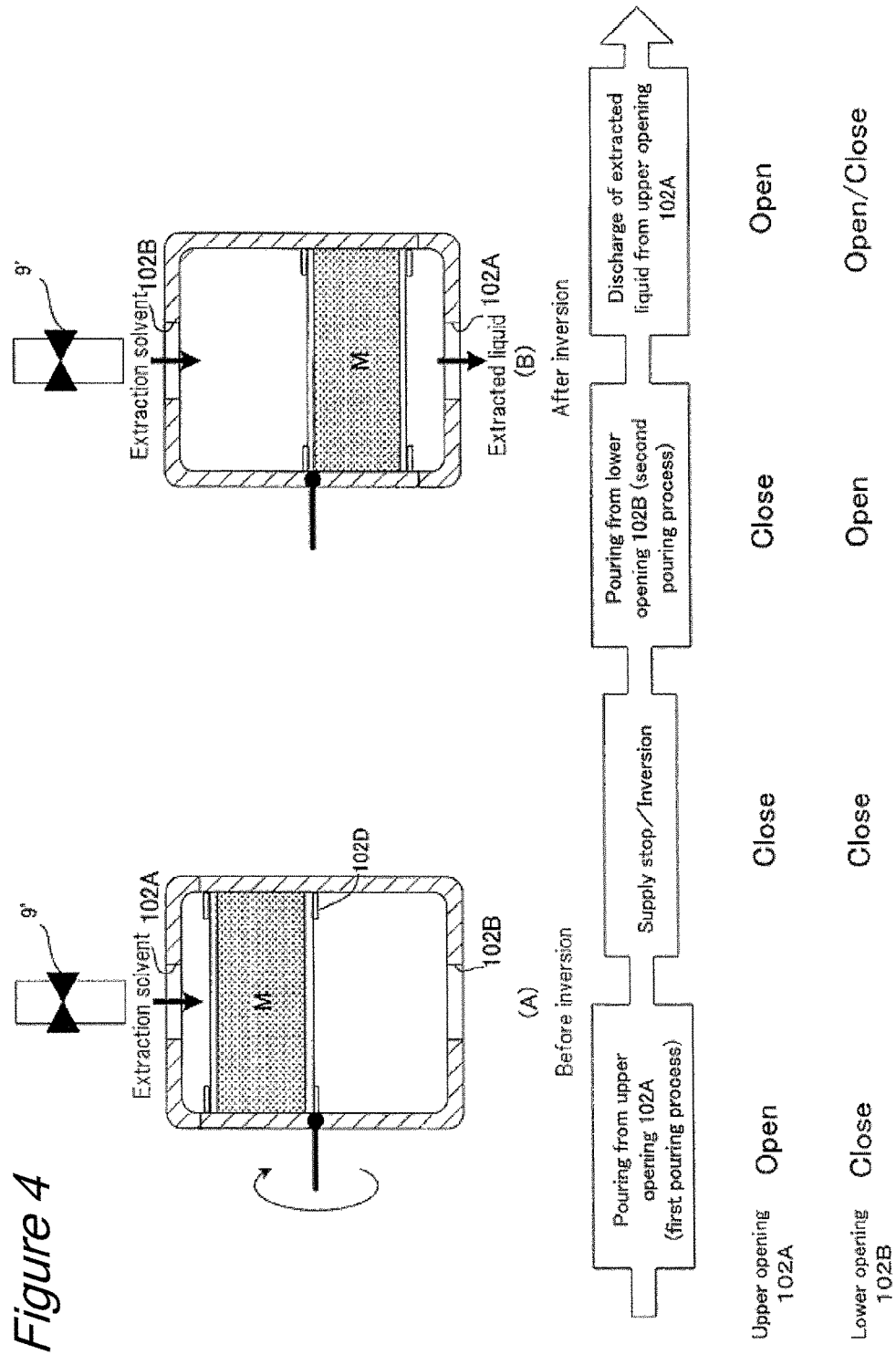
FIG. 4 is a diagram for explaining an example of the process of extraction in the present invention.

In some cases, depending on the sizes and/or positions of the upper opening 102A and the lower opening 102B, opening/closing mechanisms are required at the upper opening 102A and the lower opening 102B. FIG. 4 is a diagram for explaining the process of extraction with the coffee extraction apparatus 1' in the present embodiment. In FIG. 4, an example of a chart of timing of opening and closing of the upper opening 102A and the lower opening 102B is shown together with the granule containing part 102 before inversion and after inversion (the opening/closing mechanism is not illustrated). When a user sets the disposable unit in the hold mechanism 102D of the granule containing part 102 (or attaches the disposable cartridge to the rotary mechanism 14) and turns on a switch for the coffee extraction apparatus 1', a supply valve 9' in the conduit channel 8' is opened to pour the extraction solvent (first pouring process; see (A) in FIG. 4). During this process, the upper opening 102A of the granule containing part 102 is maintained in the open state while the lower opening 102B is maintained in the closed state.

After the completion of the first pouring process, the supply valve 9' is closed and the granule containing part 102 is inverted. During this operation, each of the upper opening 102A and the lower opening 102B is maintained in the closed state. After inversion, the lower opening 102B (positioned at the upper side of the granule containing part 102 at this time) is opened to pour the extraction solvent (second pouring process). During this process, the upper opening 102A (positioned at the lower side of the granule containing part 102 at this time) is maintained in the closed state. The extraction solvent poured in the second pouring process acts to force out (in other words, drive in a water drive manner), toward the upper opening 102A, the extract liquid extracted in the first pouring process (not discharged since the lower opening 102B is closed in the first pouring process). After the completion of the second pouring process, the upper opening 102A is opened to discharge the extract liquid. At this time, the lower opening 102B may be opened or closed. The second pouring process and the discharge process may be performed simultaneously with each other. In such a case, both the lower opening 102B and the upper opening 102A are maintained in the open state and pouring from the lower opening 102B and discharge from the upper opening 102A are simultaneously performed (see FIG. 4(B)). The arrangement may alternatively be such that another opening that functions as a port for discharge of the extract liquid is provided, for example, in the side wall 202C of the granule containing part 102, and the extract liquid is discharged from the another opening without opening the upper opening 102A in the second pouring process. In the embodiment shown in FIG. 2, since the single water tank. 4 is used, control means (e.g., a timer, a liquid level meter or the like) for controlling the amount of pouring of the extraction solvent in each of the first pouring process and the second pouring process can be provided in the coffee extraction apparatus 1'. However, two water tanks respectively corresponding to the first pouring process and the second pouring process may be used. In such a case, the control means for controlling the amount of pouring of the extraction solvent may not necessarily be provided.

The above-described extraction process enables causing the extraction solvent to reciprocate in the layer of granules M held in a substantially sealed state in the granule containing part 102. As a result, desorption and readsorption of bitter ingredients can be smoothly performed and a coffee extract liquid of good flavor from which excessively strong bitter ingredients have been removed can be obtained even at home.

As shown in FIG. 4, depending on the sizes and/or positions of the upper opening 102A and the lower opening 102B, an opening/closing mechanism at least capable of operating in order of "opening→closing→opening" is required at the upper opening 102A, and an opening/closing mechanism at least capable of operating in order of "closing→opening" is required at the lower opening 102B. If the upper opening 102A and the lower opening 102B are relatively small, opening/closing mechanisms can be provided in the body 202 of the granule containing part 102 itself. For example, a spring-type liquid drip prevention valve such as one used for conventional coffee makers can be attached to the upper end wall 202A and the lower end wall 202B of the granule containing part 102, for example, so as to be opened when brought into contact with the conduit channel 8' and to be closed when moved away from the conduit channel 8'. In such a case, the arrangement may be such that the conduit channel 8' and/or the storage container 13 can be changed in position to operate the opening/closing mechanism. The arrangement may alternatively be such that a valve that is automatically opened or closed independently of contact with the conduit channel 8' and/or the storage container 13 is attached to the body 202 of the granule containing part 102 itself. If the upper opening 102A and the lower opening 102B are relatively large, members that function as slide valves which are slidable relative to the upper opening 102A and the lower opening 102B may be provided, for example, outside the granule containing part 102 (as an internal structure of the coffee extraction apparatus 1'). Since opening/closing mechanisms such as those described above require the provision of a relatively complicated structure in the granule containing part 102, the embodiment in which only the layer of coffee granules M, the first and second filter members 10 and 11 are formed as a disposable unit is more advantageous, in terms of manufacturing cost, than the embodiment in which the granule containing part 102 itself is formed as a disposable cartridge.

In the case where the granule containing part 102 itself forms a disposable cartridge, it is preferable to form, as the upper opening 102A and the lower opening 102B, extremely small openings, which do not necessitate use of opening/closing mechanisms such as those described above.

Figure 5:
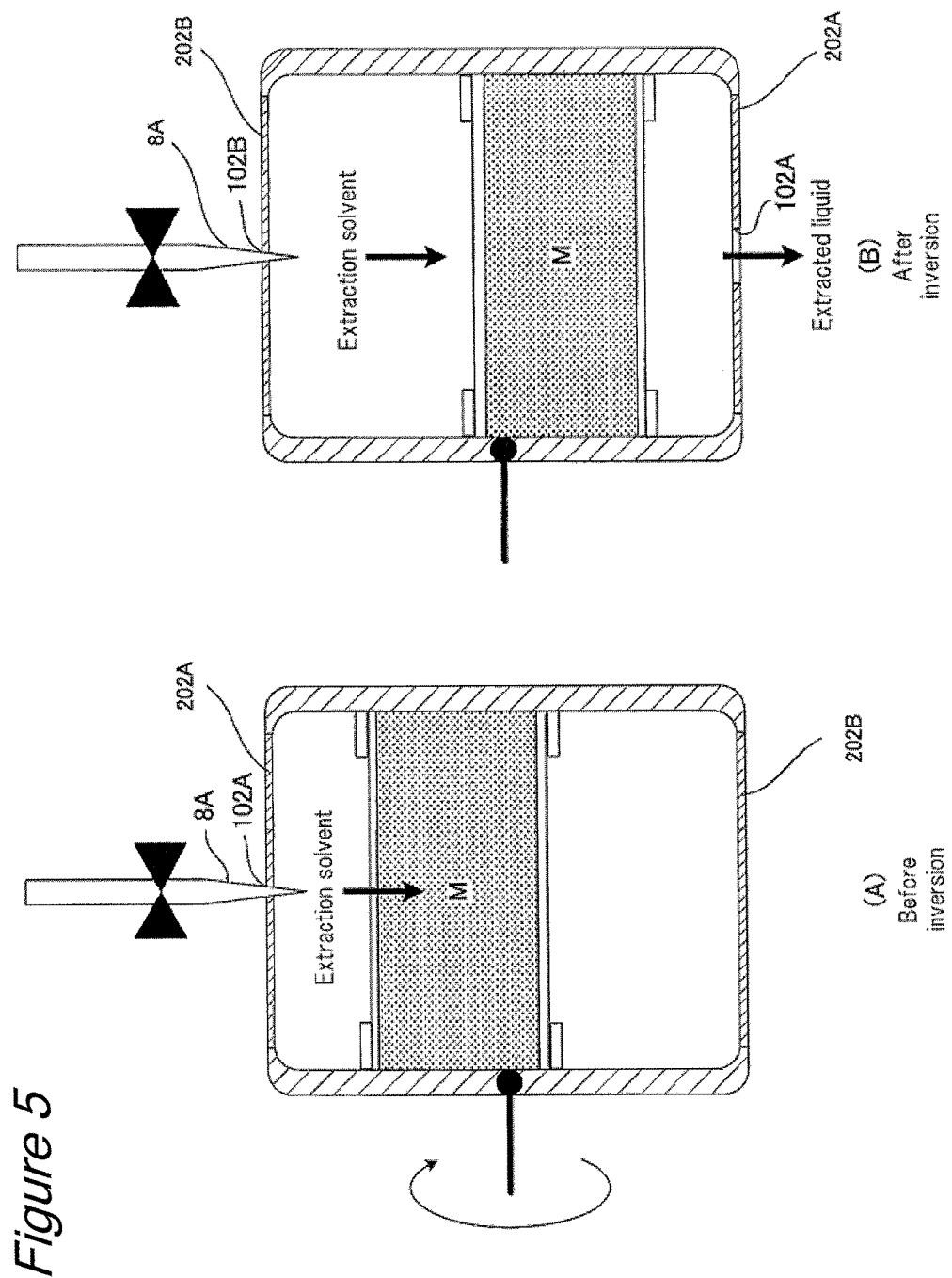
FIG. 5 shows an example of a granule containing part in capsule form which is completely closed.

In such a case, as shown in FIG. 5, the granule containing part 102 can be formed as a disposable cartridge in such a form that the entire granule containing part is completely closed (in other words, in capsule-like form) without forming in advance upper and lower openings in the walls of the body 202 of the granule containing part 102. Further, the distal end of the conduit channel 8' can be formed as a needle-like end portion 8A having an extremely small diameter and movable in the vertical direction. In the first pouring process, the needle-like end portion 8A is moved so as to pierce the upper end wall 202A of the granule containing part 102 to form the upper opening 102A having an extremely small diameter, and the extraction solvent is poured from the upper opening 102A (through an opening of the needle-like end portion 8A now located within the granule containing part 102) (FIG. 5(A)). At this time, no opening is formed in the lower end wall 202B and, therefore, the lower end wall 202B is still in the closed state, even though no opening/closing mechanism is provided. Since no opening/closing mechanism exists, the granule containing part 102 is rotated while having the upper opening 102A kept open when the granule containing part 102 is inverted. However, leakage of the liquid from the upper opening 102A is negligible since the upper opening 102A is extremely small like a needle hole. In other words, the size of the upper opening 102A is determined such that leakage of the liquid at the time of inversion is negligible. After inversion, the lower opening 102B having an extremely small diameter is formed in the lower end wall 202B by the needle-like end portion 8A in the same way as the upper opening 102A, and pouring from the lower opening 102B is performed (FIG. 5(B)). At this time, the upper end wall 202A of the granule containing part 102 may be further pierced by means of a needle-like member simultaneously with forming of the lower opening 102B for the purpose of smoothly discharging the extract liquid, and the extract liquid may be collected through a plurality of openings. Alternatively, the extraction solvent may be poured under pressure from the lower opening 102B to enlarge the upper opening 102A by the pressure and collect the extract liquid from the enlarged upper opening 102A. In the embodiment shown in FIG. 5, it is preferable to form a thin sheet of aluminum or the like as the upper end wall 202A and the lower end wall 202B of the granule containing part 102, in order to facilitate piercing with the needle-like end portion 8A.

Figure 6:
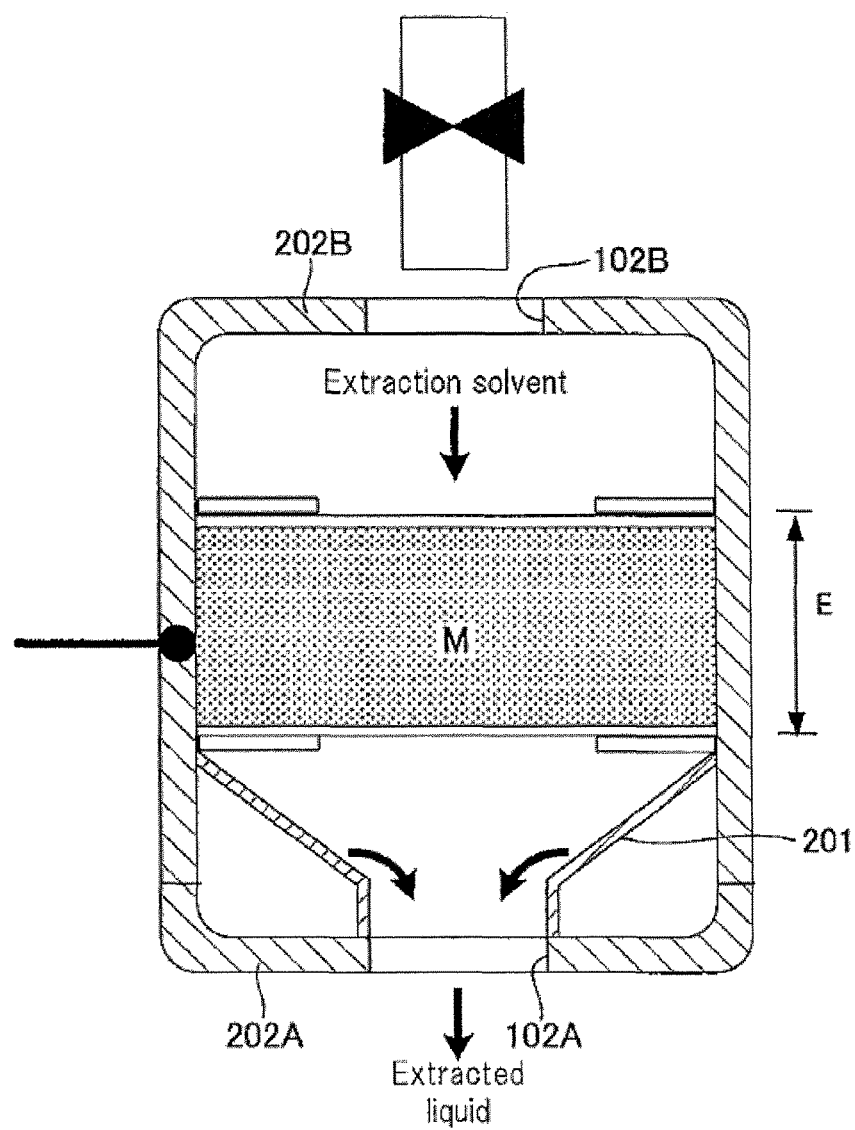
FIG. 6 shows an example of a discharge facilitating mechanism.
Figure 7:
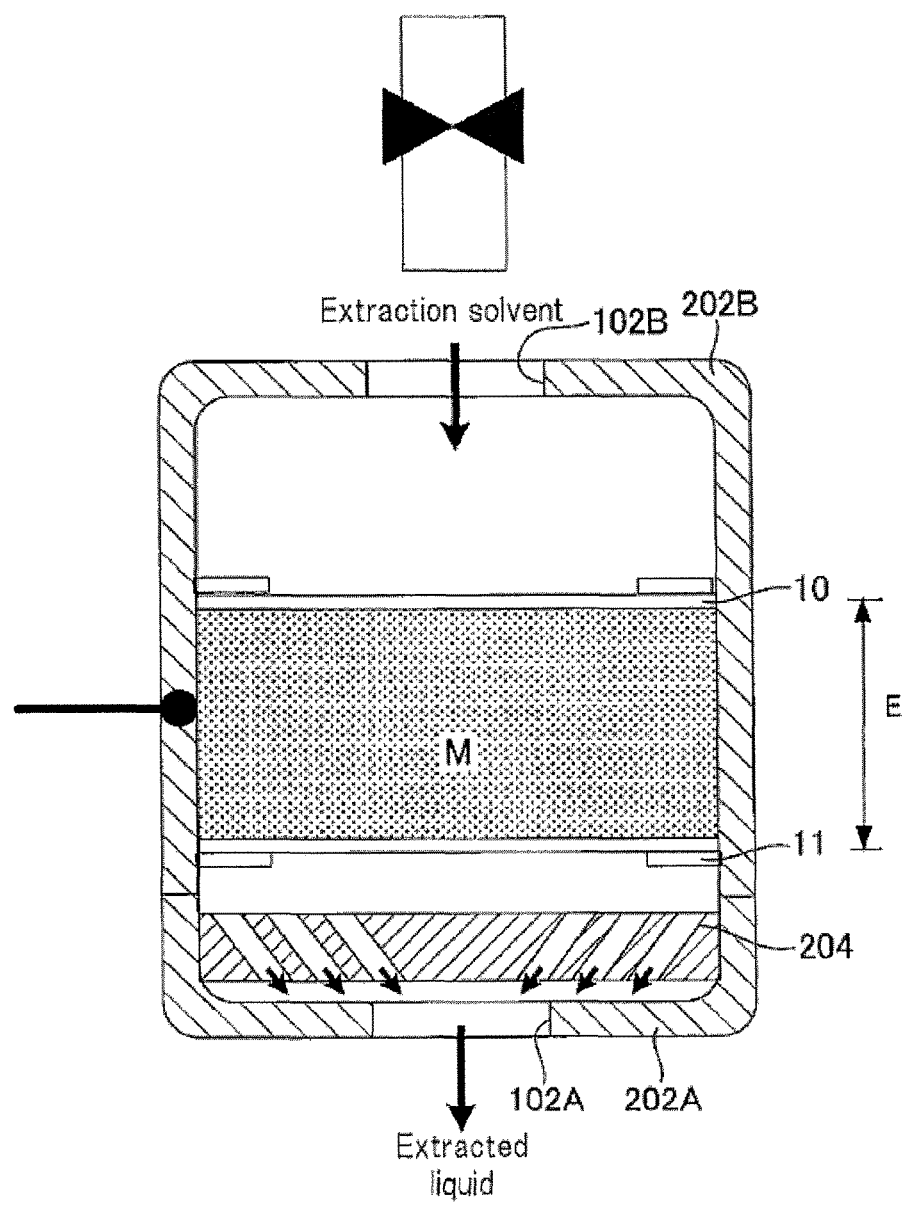
FIG. 7 shows another example of a discharge facilitating mechanism.
Figure 8:
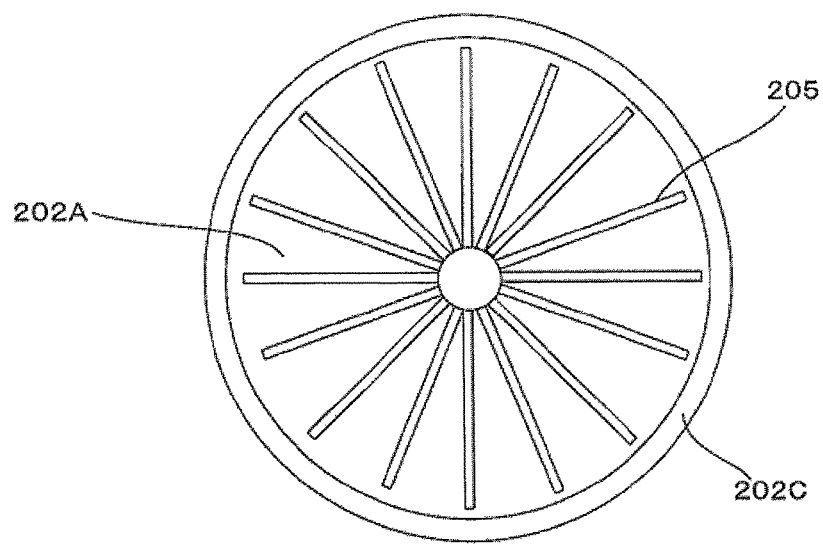
FIG. 8 shows another example of a discharge facilitating mechanism.
Figure 8:
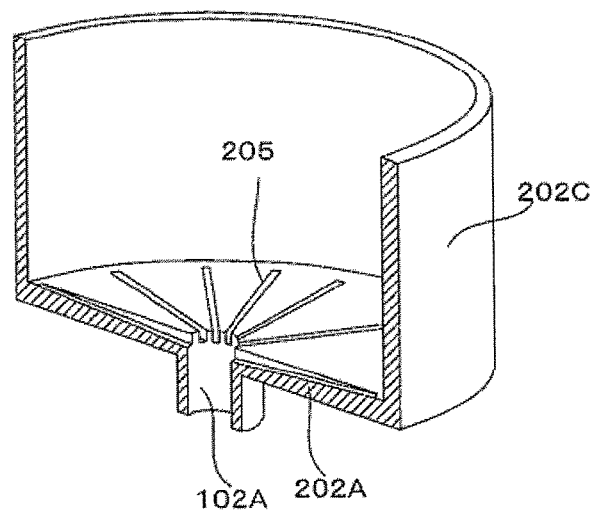

It is preferable that a discharge facilitating mechanism for smoothly discharging the coffee extract liquid be provided within the body 202 of the granule containing part 102 on the side of the upper opening 102A functioning both as a pouring port and as a discharge port. For example, as shown in FIG. 6, a member 201 in substantially funnel-like form may be provided between the upper opening 102A functioning both as a pouring port and as a discharging port and the extraction section E, thereby enabling the extract liquid after inversion to flow through a discharge path (functioning as a pouring path before inversion) from a sloped surface of the member 201 in funnel-like form and to be discharged from the upper opening 102A. As an alternative to the provision of the member 201, the body 202 of the granule containing part 102 may be formed so that the inner surface of the body 202 itself forms a sloped surface similar to that described above or a sloped surface and discharge path. As another alternative, as shown in FIG. 7, a channel forming member 204 including through-hole passages (in other words, flow passages) downwardly sloped toward the upper opening 102A after inversion may be provided between the upper opening 102A and the extraction section E. As still another alternative, as shown in FIGS. 8(A) and 8(B), grooves 205 having sloped bottom surfaces may be formed in the inner surface of the upper end wall 202A so as to cause the coffee extract liquid to flow through the grooves 205 into the upper opening 102A (having a tubular shape extending outwardly from the upper end wall in this example). Portions 205 may alternatively be formed as projections instead of being formed as grooves, such that portions between the projections are used as flow passages. FIG. 8(A) is a plan view showing the grooves 205 formed in the inner surface of the upper end wall 202A. FIG. 8(B) is a partially sectional perspective view showing the periphery of the upper opening 102A in an enlarged state.

Figure 9:
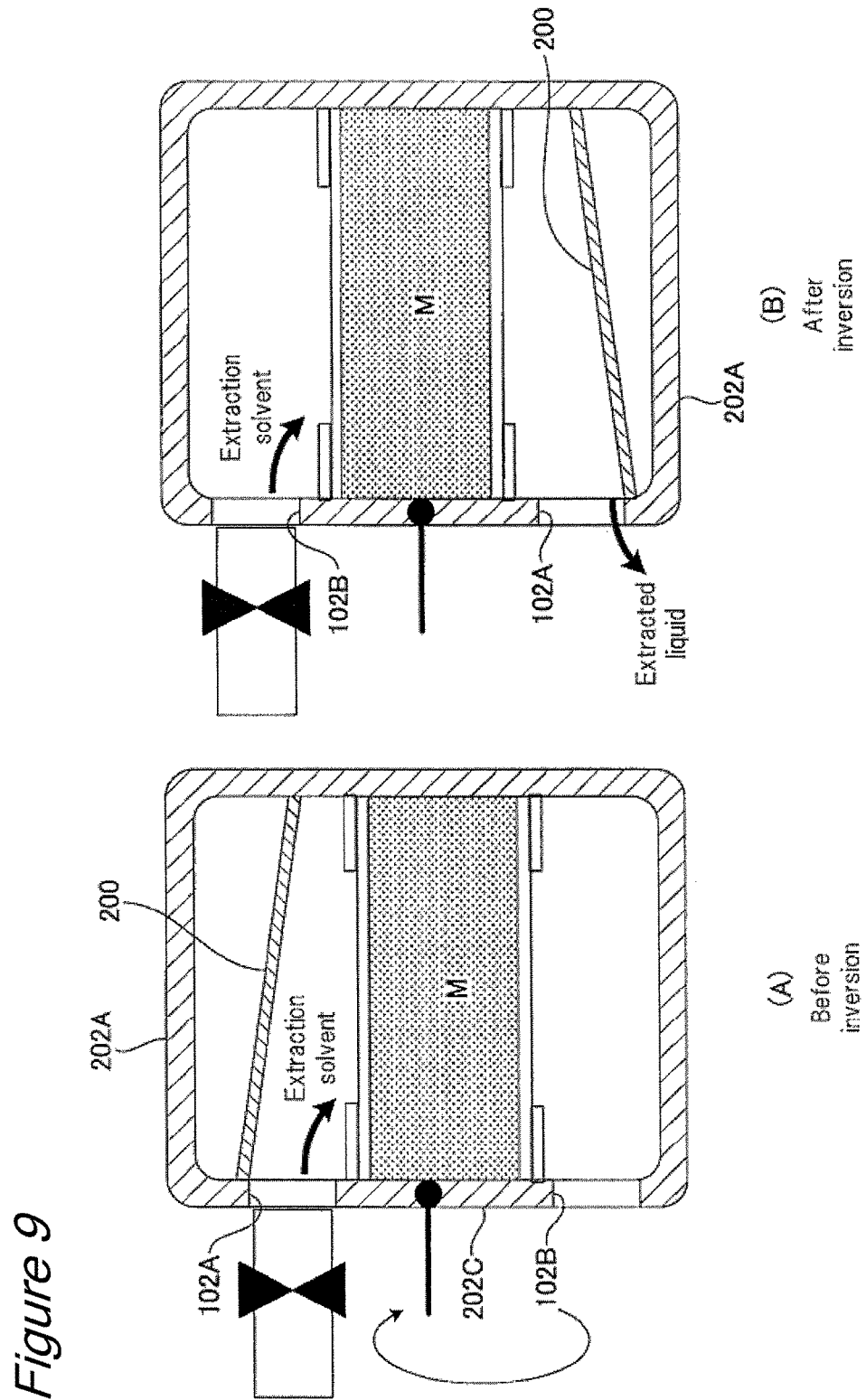
FIG. 9 shows an example of the granule containing part having openings formed in the side wall.

The upper opening 102A and the lower opening 102B may be formed in an upper position in the side wall 202C (upper side wall) and in a lower position in the side wall 202C (lower side wall) of the granule containing part 102, respectively. FIG. 9 shows an example of the granule containing part 102 having the upper opening 102A and the lower opening 102B formed in the side wall 202C of the body 202. In this case, the granule containing part 102 can be used in a coffee extraction apparatus 1 such as the example shown in FIG. 1, in which the conduit channel 8 opens laterally. In this case, the distal end of the conduit channel 8 can be formed so as to be insertable in and extractable from each of the upper opening 102A and the lower opening 102B so as to enable inversion of the granule containing part 102. Also in a case where the granule containing part 102 is a disposable cartridge, the distal end of the conduit channel 8 that opens laterally can be formed as needle-like end portion 8A, and extremely small upper opening 102A and lower opening 102B can be formed in an upper position and a lower position, respectively, in the side wall 202C by means of the needle-like end portion 8A.

Also in this case, it is preferable that a discharge facilitating mechanism for smoothly discharging the coffee extract liquid be provided within the body 202 on the side of the upper opening 102A functioning both as pouring port and as discharging port. It is preferable to form, for example, as shown in FIG. 9, a sloped surface 200 downwardly sloped toward the upper opening 102A after inversion, in order to enable the extract liquid to be smoothly discharged from the upper opening 102A.

Figure 10:
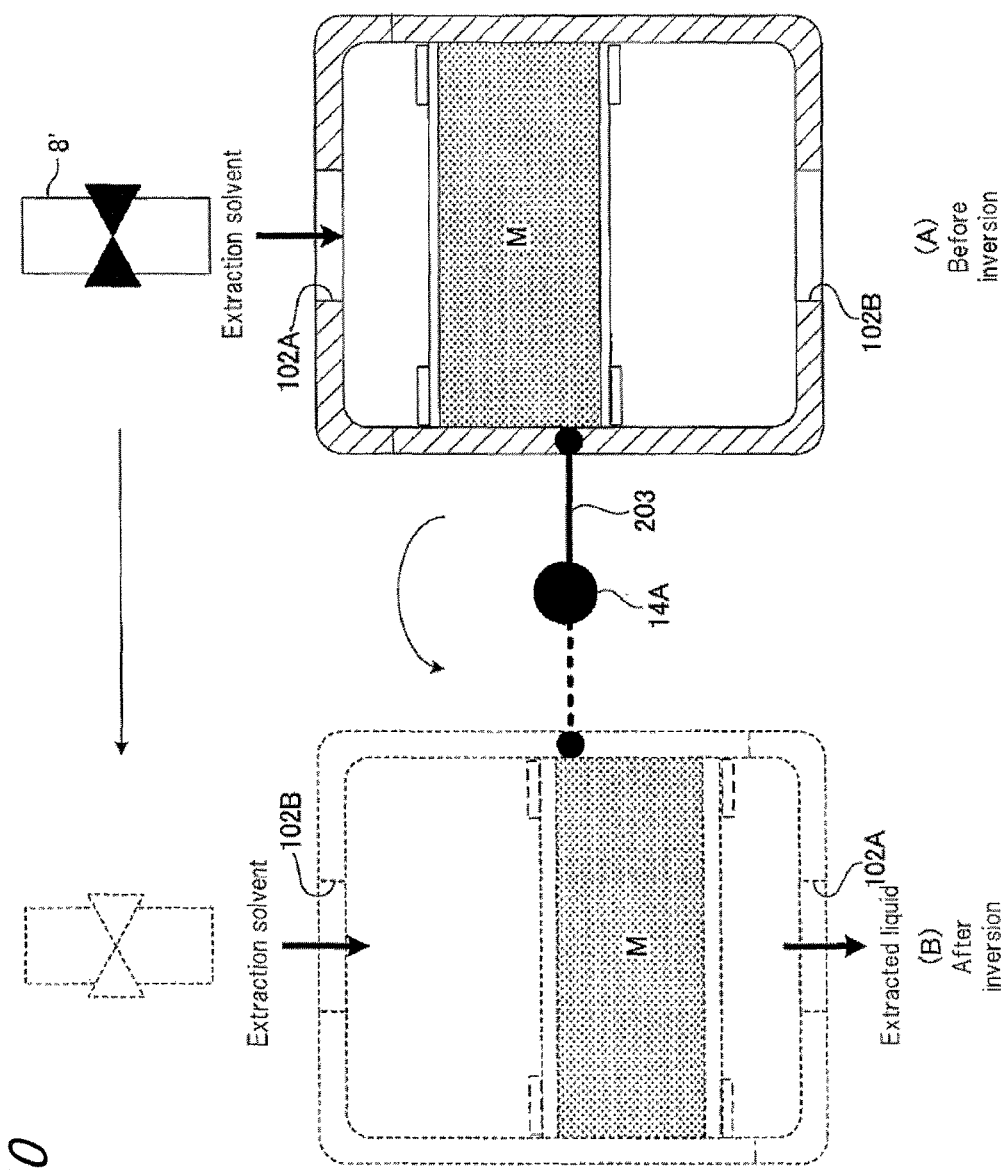
FIG. 10 shows another example of a method for turning the granule containing part upside down.

While in the embodiment shown in FIG. 2 the shaft 203 of the granule containing part 102 is provided in the direction corresponding to the direction of the rotary shaft 14A of the rotary mechanism 14, the shaft 203 of the granule containing part 102 may alternatively be provided in a direction intersecting the rotary shaft 14A of the rotary mechanism 14 according to the present invention. In such a case, while the position of the shaft 203 itself (in other words, the position of the axis of the shaft 203) is not changed at the time of inversion in the embodiment shown in FIG. 2, the shaft 203 itself is rotated through 180 degrees in the present embodiment (the orientation of the shaft 203 is reversed, in other words, horizontally inverted). In this embodiment, the arrangement may be such that, when the shaft 203 is rotated, the position of the conduit channel 8' is translated according to the position of the granule containing part 102 (see FIG. 10).

In the case where the upper and lower openings 102A and 102B are formed in the upper end and lower end walls 202A and 202B of the body 202, it is preferable to carry out, as an extraction solvent pouring method, pouring by a free fall substantially equivalent to a fall by the force of gravity, in order to prevent the layer of granules M from being moved in the extraction section E by the force of the extraction solvent. It is also preferable, for example, to perform pouring along a wall provided in the granule containing part 102 (the above-described discharge facilitating mechanisms 200 and 201 and the like can function as such a wall) or gently perform showering pour. Also, dispersion plates having a plurality of openings (see FIG. 11) may be disposed outside the first and second filter members in order to uniformly pass the extraction solvent through the entire layer of granules M.

In the case where the upper and lower openings 102A and 102B are formed in the side wall 202C of the body 202, there is substantially no problem with the force of the extraction solvent but it is also preferable, for example, to perform pouring along a wall provided in the granule containing part 102 or gently perform showering pour, as in the case of pouring from the upper end and lower end walls 202A and 202B. Also, dispersion plates having a plurality of openings (see FIG. 11) may be disposed outside the first and second filter members in order to uniformly pass the extraction solvent through the entire layer of granules M.

Embodiments of the coffee extraction apparatus according to the present invention include those in which pouring of the extraction solvent and inversion of the granule containing part are manually performed, and those in which pouring is automatically performed while inversion is manually performed as well as those described above in which pouring and inversion are automatically performed. FIGS. 12 to 15 show other embodiments of the coffee extraction apparatus to which the present invention is applied.

Figure 12:
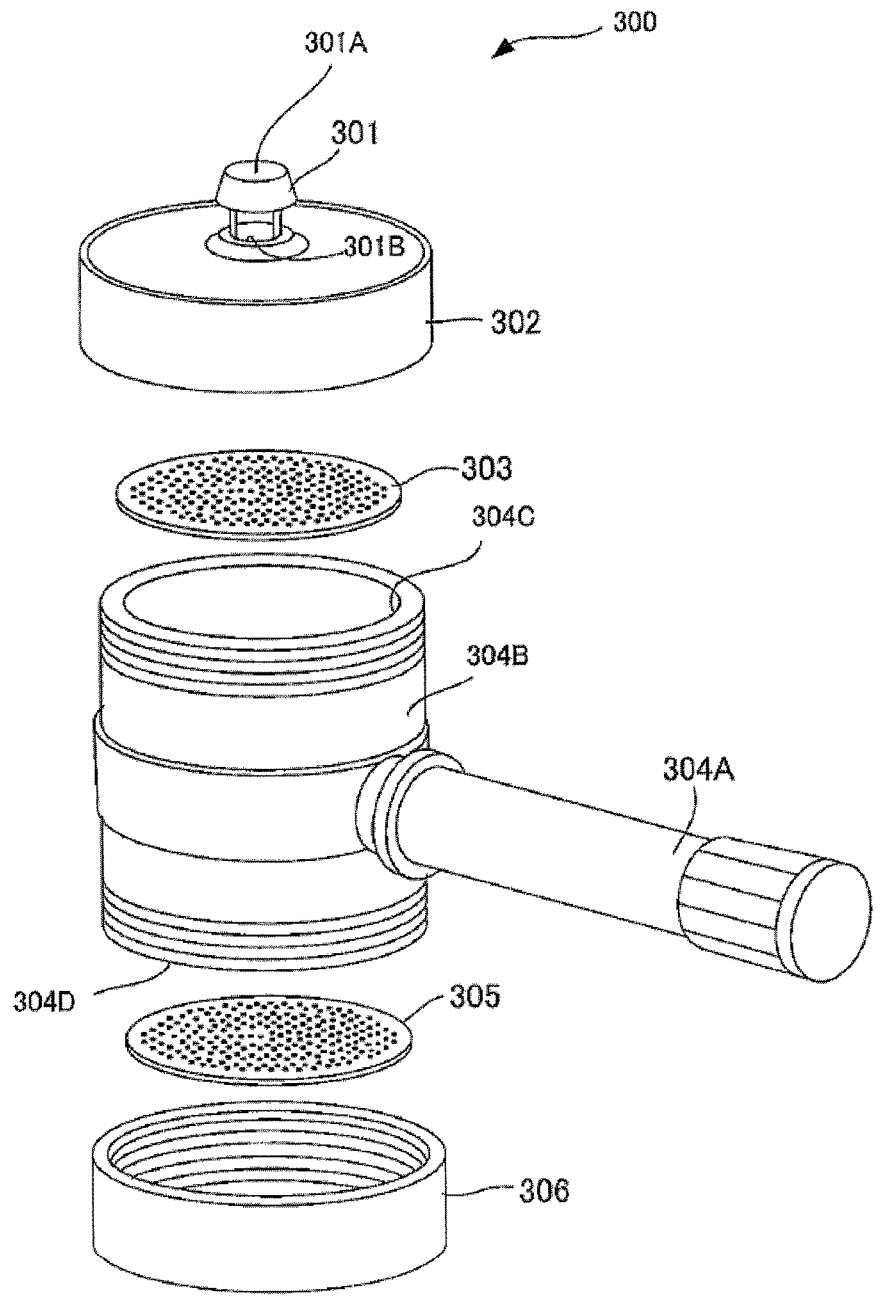
FIG. 12 is an exploded perspective view of a handy drip type coffee extraction apparatus according to the present invention.
Figure 13:
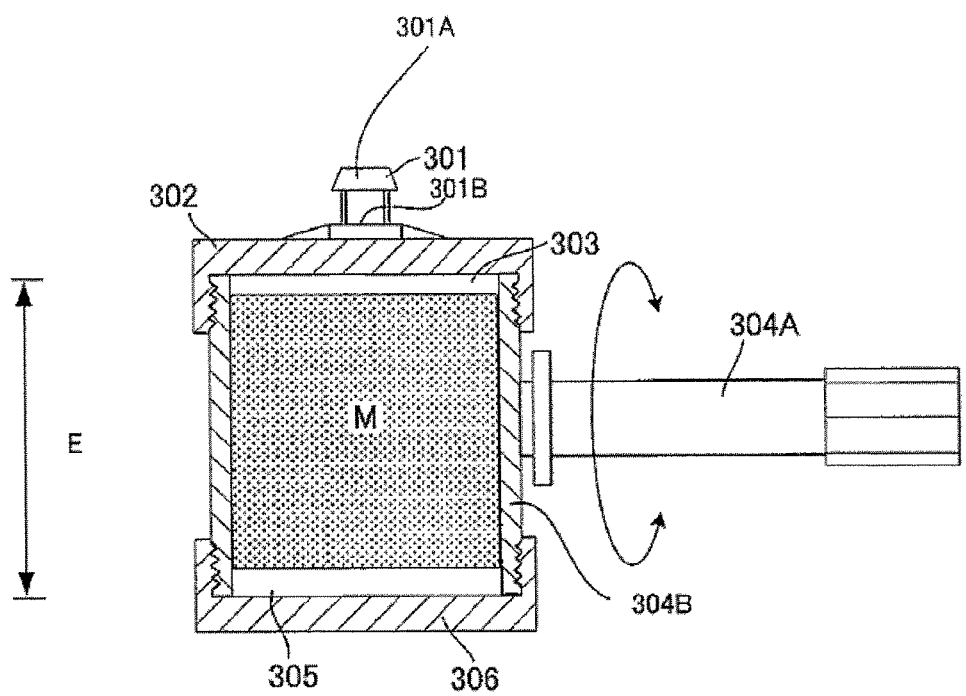
FIG. 13 is a schematic sectional side view of the coffee extraction apparatus shown in FIG. 12.

FIGS. 12 and 13 are diagrams showing an example of a so-called handy drip-type coffee extraction apparatus. FIG. 12 is an exploded perspective view of a coffee extraction apparatus 300. FIG. 13 is a schematic sectional side view of a granule containing part 304B of the coffee extraction apparatus 300.

As shown in FIG. 12, the coffee extraction apparatus 300 in the present embodiment comprises: the granule containing part 304B adapted to contain a layer of coffee granules M and a first filter member 305 and a second filter member 303 that hold the layer of granules M in a substantially sealed state; a handle 304A attached to the granule containing part 304B; an upper lid member 302 detachably attached to an upper portion of the granule containing part 304B; and a lower lid member 306 detachably attached to a lower portion of the granule containing part 304B. The upper lid member 302 has a valve 301 including a valve body 301A capable of being moved by the action of gravity. The coffee extraction apparatus 300 is constructed such that both pouring of an extraction solvent and inversion of the granule containing part are manually performed.

It is preferable to make the shape of the granule containing part 304B substantially uniform in inside diameter along the direction of onward movement of the coffee extract liquid in order to immobilize coffee granules M and facilitate readsorption of bitter ingredients, as in the case of the above-described embodiments. The "shape substantially uniform in inside diameter" means that the sectional shape of a deposited layer of coffee granules M in the axial direction is generally circular or generally rectangular, that is, the shape is such that the coffee granules M can be contained by being deposited in cylindrical or rectangular block form (including cubic form). Accordingly, the shape of the granule containing part 304B is not limited to a cylindrical shape such as the illustrated one. Also, in order to remove bitter ingredients in a chromatography manner by making the extraction solvent to sufficiently reciprocate in the layer of granules M, in a case where the granule containing part 304B has, for example, a cylindrical shape, it is preferable to determine the size of the layer of granules M so that, in the generally rectangular sectional shape of the granule layer in the axial direction, the ratio (H/L) of the width (L) and the height (H) of the rectangle is within a range from 0.1 to 10 (preferably from 2 to 6, more preferably from 3 to 6). In the present embodiment, therefore, it is preferable to design the size of the granule containing part 304B itself so that the size satisfies the above-described condition of H/L ratio (the entire region inside the granule containing part 304B forms an extraction section E in this case) and it is preferable that a user him/herself fill the granule containing part 304B with coffee granules or a special disposable unit (formed by combining a layer of coffee granules M and the first and second filter members 305 and 303 as a single unit). The arrangement may alternatively be such that a hold mechanism for holding the disposable unit in a predetermined position in the granule containing part 304B is provided and the size of the region (extraction section E) in the hold mechanism is designed so as to satisfy the above-described condition of H/L ratio.

In the present embodiment, the granule containing part 304B is formed substantially by a cylindrical side wall whose upper and lower ends are open (which upper and lower ends are referred to as "upper opening 304C" and "lower opening 304D", respectively). The upper opening 304C and the lower opening 304D respectively function as an extraction solvent pouring port before inversion of the granule containing part 304B and an extraction solvent pouring port after inversion of the granule containing part 304B. The upper lid member 302 and the lower lid member 306 can be fixed to an upper portion and a lower portion, respectively, of the granule containing part 304B, for example, by threadable engagement. Accordingly, in the present embodiment, as shown particularly in FIG. 13, threaded portions corresponding to each other are formed on an inner peripheral portion of the upper lid member 302 and an upper outer peripheral portion of the granule containing part 304B, and other threaded portions corresponding to each other are formed in an inner peripheral portion of the lower lid member 306 and a lower outer peripheral portion of the granule containing part 304B. Means for fixing the upper and lower lid members 302 and 306 to the granule containing part 304B is not limited to the threaded portions such as the illustrated ones. Further, the upper lid member 302 has an opening 301B at its center and has the valve 301 for opening and closing the opening 301B. The valve 301 has the valve body 301A which can be moved by the action of gravity. More specifically, the valve body 301A is constructed so as to be in contact with the upper lid member 302 to thereby close the opening 301B before inversion of the granule containing part 304B and to move in a direction away from the upper lid member 302 (i.e., in the direction of gravity) to thereby open the opening 301B after inversion. The opening 301B thus functions as a coffee extract liquid discharge port after inversion. In FIG. 12, a state in which the opening 301B is opened is illustrated for ease of understanding.

The kind of material for the first filter member 305 and the second filter member 303 and the shape or the like of the filter members are not particularly limited as long as they are capable of holding coffee granules M in a substantially sealed state, capable of being inscribed in the granule containing part 304B, capable of allowing the extraction solvent and the extract liquid to pass therethrough and capable of preventing coffee granules M from falling and mixing with the coffee extract liquid, as in the case of the first and second filter members 10 and 11 in the above-described embodiment. In this respect, the first and second filter members 305 and 303 can function in the same manner as the restraining members in the above-described embodiment. More specifically, each of the first and second filter members 305 and 303 may be a mesh member, such as metal mesh, nonwoven fabric (flannel, lint or the like) or a paper filter. If the mesh size of the filter member is excessively small, clogging occurs easily, the time required for extraction is increased and there is a possibility of over-extraction. It is, therefore, preferable to use a mesh member having a mesh size of about American mesh 20 to 200 if the mesh member is metal mesh. From the viewpoint of enabling adsorption and removal of oil ingredients in the coffee extract liquid, it is preferable to use nonwoven fabric. The first filter member 305, the layer of granules M and the second filter member 303 may be combined integrally with each other to form a disposable unit, as described above. In such a case, the first filter member 305 and the second filter member 303 may be connected to each other around the layer of granules M, or the entire layer of granules M may be covered with a single filter member in sack-like form, which is not divided into the first filter member 305 and the second filter member 303. To enable the extraction solvent and the extract liquid to be uniformly passed through the extraction section E, the outside each of the first filter member 305 and the second filter member 303 may be covered with a dispersion plate having a plurality of openings formed therein as shown in FIG. 11. Also, dispersion plates may be used in place of the first filter member 305 and the second filter member 303.

In use, the lower lid member 306 is attached to the granule containing part 304B, the first filter member 305 is placed in the granule containing part 304B, and coffee granules M are thereafter packed on the first filter member 305 to form a layer of granules M. Next, the second filter member 303 is disposed so as to cover the upper surface of the layer of coffee granules M, and hot water is manually supplied to the layer of granules M through the upper opening 304C. Alternatively, the lower lid member 306 is mounted to the granule containing part 304B, the above-described disposable unit is loaded in the granule containing part 304B, and hot water is manually supplied to the layer of granules M through the upper opening 304C. After pouring hot water to the upper surface of the layer of coffee granules M, the upper lid member 302 is mounted to the granule containing part 304B, and the granule containing part 304B is manually turned upside down by holding the handle 304A. In this state, the granule containing part 304B is put on a coffee cup. At this time, as a result of inversion, the lower lid member 306 is positioned at the upper side of the granule containing part 304B, and the upper lid member 302 is positioned at the lower side of the granule containing part 304B. Therefore, the valve disc 301A on the upper lid member 302 is lowered by the action of gravity to open the opening 301B. Next, the lower lid member 306 is removed from the granule containing part 304B and hot water is manually supplied to the layer of granules M through the lower opening 304D. The coffee extract liquid is thereby smoothly poured from the opening 301B of the upper lid member 302 into the coffee cup.

As described above, also in the present embodiment, the extraction solvent can be caused, by inversion of the granule containing part 304B in the vertical direction and water drive, to reciprocate in the layer of granules M retained in the granule containing part 304B in a substantially sealed state. Thus, desorption and readsorption of bitter ingredients can be performed smoothly to thereby obtain, even at home, a coffee extract liquid of good flavor from which excessively strong bitter ingredients have been separated.

Figure 14:
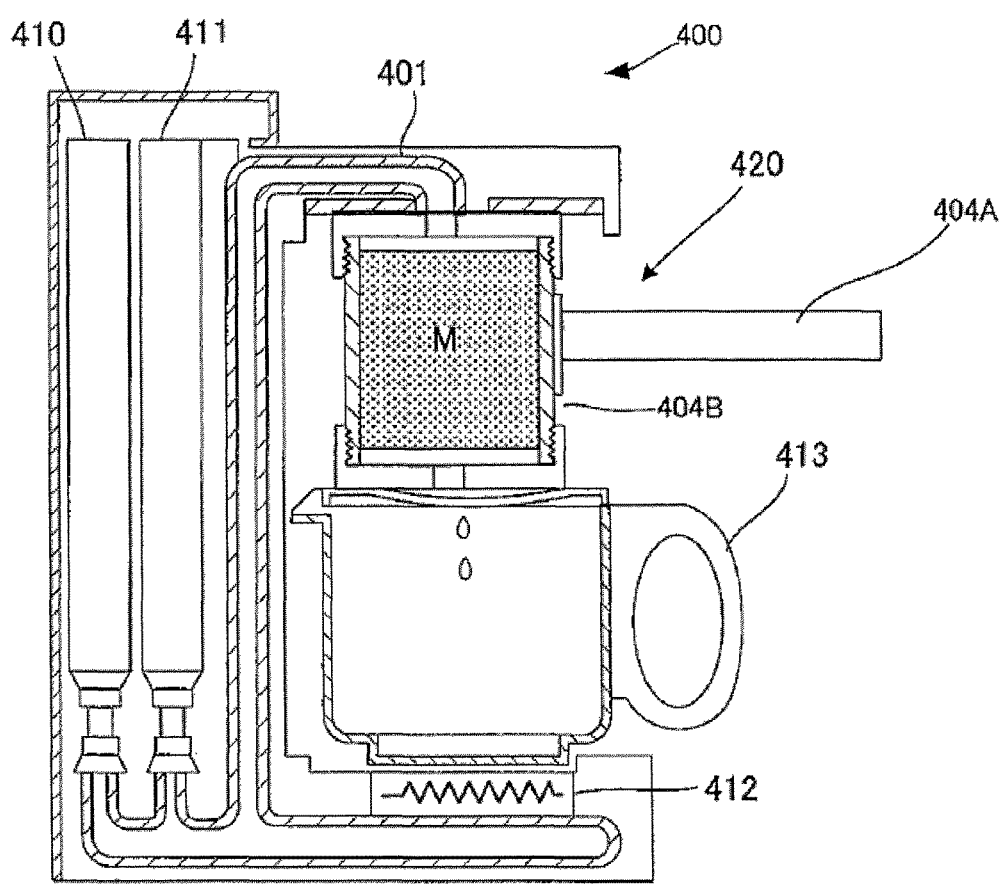
FIG. 14 shows an electrically powered coffee extraction apparatus according to another embodiment of the present invention.
Figure 15:
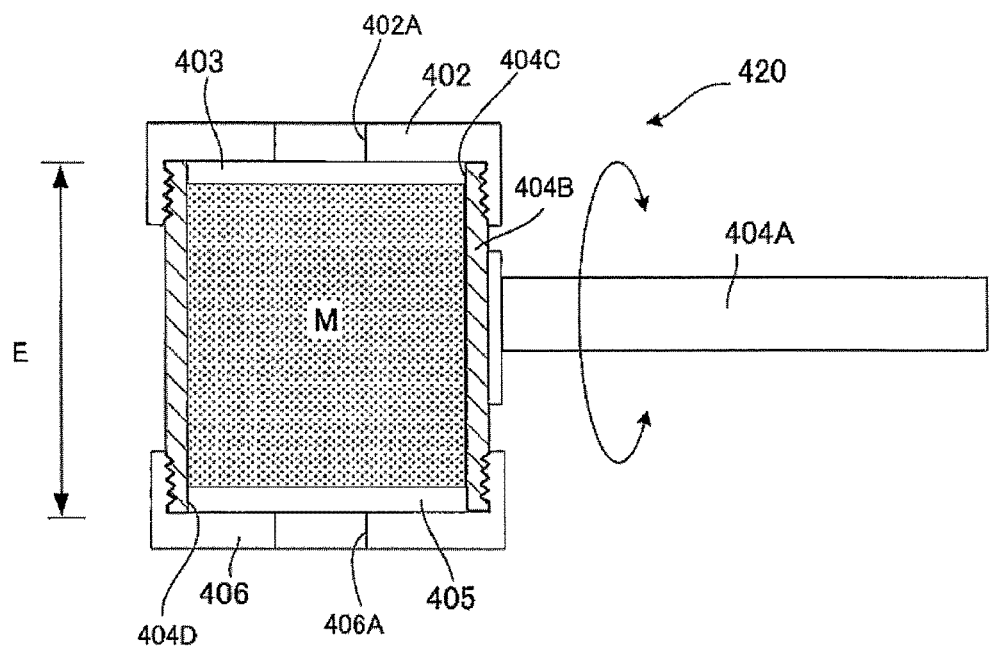
FIG. 15 shows a schematic sectional side view of the granule containing part shown in FIG. 14.

FIG. 14 shows another embodiment of the electrically powered coffee maker according to the present invention. A coffee extraction apparatus 400 in the present embodiment is an apparatus allowing automatic pouring of an extraction solvent and manual inversion of a granule containing part unlike the embodiment shown in FIG. 2. In the coffee extraction apparatus 400, an extraction solvent is poured into a granule containing part 420, which comprises a granule containing part body 404B adapted to contain a layer of coffee granules M and first and second filter members 405 and 403 for retaining the layer of granules M in a substantially sealed state, and a coffee extract liquid is collected. The coffee extraction apparatus 400 includes, as pouring device, water tanks 410 and 411 and a single conduit channel 401 that is open to an upper portion of the granule containing part 420. Water stored in the water tanks 410 and 411 is heated by a heater 412 to become hot water, which is then supplied as extraction solvent from the conduit channel 401 into the granule containing part body 404B. The coffee extract liquid after the extraction process is accumulated in a storage container 413 and is kept warm by the heater 412. Differing from the apparatus shown in FIG. 2, inversion of the granule containing part body 404B is manually performed and therefore a rotary mechanism such as the rotary mechanism 14 is not provided.

The granule containing part 420 further comprises a handle 404A attached to the granule containing part body 404B, an upper lid member 402 detachably attached to an upper portion of the granule containing part body 404B, and a lower lid member 406 detachably attached to a lower portion of the granule containing part body 404B.

It is preferable to make the shape of the granule containing part body 404B substantially uniform in inside diameter along the direction of onward movement of the coffee extract liquid, in order to immobilize coffee granules M and facilitate readsorption of bitter ingredients, as in the case of the above-described embodiments. The "shape substantially uniform in inside diameter" means that the sectional shape of the deposited layer of coffee granules M along the axial direction is generally circular or generally rectangular, that is, the shape is such that the coffee granules M can be contained by being deposited in cylindrical or rectangular block form (including cubic form). Accordingly, the shape of the granule containing part body 404B is not limited to the cylindrical shape. Also, in order to remove bitter ingredients in a chromatography manner by making the extraction solvent to sufficiently reciprocate in the layer of granules M, in a case where the granule containing part body 404B has, for example, a cylindrical shape, it is preferable to determine the size of the layer of granules M so that, in the generally rectangular sectional shape of the granule layer in the axial direction, the ratio (H/L) of the width (L) and the height (H) of the rectangle is within a range from 0.1 to 10 (preferably from 2 to 6, more preferably from 3 to 6). In the present embodiment, therefore, it is preferable to design the size of the granule containing part body 404B itself so that the size satisfies the above-described condition of H/L ratio (the entire region inside the granule containing part body 404B forms an extraction section E in this case) and it is preferable that a user him/herself fill the granule containing part body 404B with coffee granules or a special disposable unit (formed by combining a layer of coffee granules M and the first and second filter members 405 and 403 as a single unit). The arrangement may alternatively be such that a hold mechanism for holding the disposable unit in a predetermined position in the granule containing part body 404B is provided and the size of the region (extraction section E) in the hold mechanism is designed so as to satisfy the above-described condition of H/L ratio.

In the present embodiment, the granule containing part body 404B is formed substantially by a cylindrical side wall whose upper and lower ends are open (which upper and lower ends are referred to as "upper opening 404C" and "lower opening 404D", respectively). The upper lid member 402 and the lower lid member 406 can be fixed to an upper portion and a lower portion, respectively, of the granule containing part body 404B, for example, by threadable engagement. Accordingly, in the present embodiment, as shown particularly in FIG. 15, threaded portions corresponding to each other are formed on an inner peripheral portion of the upper lid member 402 and an upper outer peripheral portion of the granule containing part body 404B, and other threaded portions corresponding to each other are formed on an inner peripheral portion of the lower lid member 406 and an lower outer peripheral portion of the granule containing part body 404B. Means for fixing the upper and lower lid members 402 and 406 to the granule containing part body 404B is not limited to the threaded portions such as the illustrated ones. Further, the upper lid member 402 and the lower lid member 406 respectively have an upper opening 402A and a lower opening 406A. The upper opening 402A and the lower opening 406A are positioned so as to face each other and communicate with the upper opening 404C and the lower opening 404D of the granule containing part body 404B when the upper lid member 402 and the lower lid member 406 are attached to the granule containing part body 404B. Before the coffee extraction apparatus 400 is operated (in other words, before the granule containing part 420 is inverted), the upper opening 402A is positioned so as to directly face the supply port of the conduit channel 401 and functions as a pouring port through which the extraction solvent is poured from the conduit channel 401. After inversion, the lower opening 406A directly faces the supply port of the conduit channel 401 and functions as a pouring port through which the extraction solvent is poured from the conduit channel 401. Discharge of the coffee extract liquid is performed through the upper opening 402A positioned at the lower side of the granule containing part body 404B after inversion. Thus, the upper opening 402A functions as an extraction solvent pouring port and as an extract liquid discharging port, while the lower opening 406A functions only as an extraction solvent pouring port.

The extraction process performed by the coffee extraction apparatus 400 is substantially the same as that shown in FIG. 4. Accordingly, an opening/closing mechanism at least capable of operating in order of "opening→closing→opening" is required at the upper opening 402A, and an opening/closing mechanism at least capable of operating in order of "closing→opening" is required at the lower opening 406A. When the upper opening 402A and the lower opening 406A are relatively small, opening/closing mechanisms can be provided in the upper lid member 402 and the lower lid member 406. For example, a spring-type liquid drip prevention valve such as one used for conventional coffee makers can be attached to each of the upper lid member 402 and the lower lid member 406, which valve is adapted, for example, to be opened when brought into contact with the conduit channel 401 and to be closed when moved away from the conduit channel 401. In such a case, the arrangement may be such that the conduit channel 401 and/or the storage container 413 can be changed in position to operate the opening/closing mechanism. The arrangement may alternatively be such that a valve that is automatically opened or closed independently of contact with the conduit channel 401 and/or the storage container 413 is attached to the upper lid member 402 and the lower lid member 406. When the upper opening 402A and the lower opening 406A are relatively large, members that function as slide valves which are slidable with respect to the upper opening 402A and the lower opening 406A may be provided, for example, outside the granule containing part 420 (as an internal structure of the coffee extraction apparatus 400).

The kind of material for the first filter member 405 and the second filter member 403 and the shape or the like of the filter members are not particularly limited as long as they are capable of holding coffee granules M in a substantially sealed state, capable of being inscribed in the granule containing part body 404B, capable of allowing the extraction solvent and the extract liquid to pass therethrough and capable of preventing coffee granules M from falling and mixing with the coffee extract liquid, as in the above-described embodiments. In this respect, the first and second filter members 405 and 403 can function in the same manner as the restraining members in the above-described embodiments. More specifically, each of the first and second filter members 405 and 403 may be a mesh member, such as metal mesh, nonwoven fabric (flannel, lint or the like) or a paper filter. If the mesh size of the filter member is excessively small, clogging occurs easily, the time required for extraction is increased and there is a possibility of over-extraction. It is, therefore, preferable to use a mesh member having a mesh size of about American mesh 20 to 200 if the mesh member is metal mesh. From the viewpoint of enabling adsorption and removal of oil ingredients in the coffee extract liquid, it is preferable to use nonwoven fabric. The first filter member 405, the layer of granules M and the second filter member 403 may be combined integrally with each other to form a disposable unit, as described above. In such a case, the first filter member 405 and the second filter member 403 may be connected to each other around the layer of granules M, or the entire layer of granules M may be covered with a single filter member in sack-like form, which is not divided into the first filter member 405 and the second filter member 403. To enable the extraction solvent and the extract liquid to be uniformly passed through the extraction section E, the outside each of the first filter member 405 and the second filter member 403 may be covered with dispersion plates each having a plurality of openings formed therein as shown in FIG. 11. Also, dispersion plates may be used in place of the first filter member 405 and the second filter member 403.

In use, the lower lid member 406 is attached to the granule containing part body 404B, the first filter member 405 is placed in the granule containing part body 404B, and coffee granules M are thereafter packed on the first filter member 405 to form a layer of granules M. Next, the second filter member 403 is disposed so as to cover the upper surface of the layer of coffee granules M, and the upper lid member 402 is attached to the granule containing part body 404B. Alternatively, the lower lid member 406 is attached to the granule containing part body 404B, the above-described disposable unit is loaded in the granule containing part body 404B, and the upper lid member 402 is attached to the granule containing part body 404B.

Next, in order to perform the automatic hot water supply, the granule containing part 420 is set in a predetermined position between the opening of the conduit channel 401 and the storage container 413. A support member therefor (not shown) may be provided in the coffee extraction apparatus 400.

After the granule containing part 420 has been set, a switch for the coffee extraction apparatus 400 is turned on to automatically pour a predetermined amount of the extraction solvent from one of the water tanks 410 and 411 into the granule containing part body 404B through the opening 402A of the upper lid member 402. After the pouring of the predetermined amount of the extraction solvent, the granule containing part 420 is taken out by holding the handle 404A and is manually inverted in the vertical direction. The inverted granule containing part 420 is returned to the predetermined position between the opening of the conduit channel 401 and the storage container 403. At this time, as a result of inversion, the lower lid member 406 is positioned at the upper side of the granule containing part body 404B, while the upper lid member 402 is positioned at the lower side of the granule containing part body 404B. Next, for example, the switch for the coffee extraction apparatus 400 is again turned on, to thereby automatically pour the extraction solvent from the other of the water tanks 410 and 411 through the opening 406A of the lower lid member 406.

In the present embodiment, two water tanks 410 and 411 are provided; two different water tanks are used in the pouring process before inversion and the pouring process after inversion, respectively. However, control means for controlling the amount of pouring of the extraction solvent (e.g., a liquid level meter and a timer or the like) may be provided and pouring from one water tank may be performed before and after inversion. Accordingly, the coffee extraction apparatus 400 may comprise a single water tank.

The coffee extraction apparatuses that use coffee granules as granules for extraction of a beverage and that collect a coffee extract liquid have been described as the embodiments of the present invention by way of example. However, the present invention is not limited to coffee extraction apparatuses. The present invention is applicable to beverage extraction apparatuses in general for obtaining a beverage from a raw material prepared by roasting a plant body for extraction. Granules for beverage extraction used according to the present invention include, in addition to the coffee granules, plant bodies roasted for extraction and pulverized, e.g., toasted tea leaves, unpolished rice tea grains, barley leaves for barley water and toasted soy bean tea grains, which are not necessarily grains.

The present invention is not limited to the above-described embodiments. Various modifications are possible as long as reciprocating movement of the extraction solvent in the layer of granules is enabled by retaining the layer of granules in a substantially sealed state in the granule containing part and by inverting the granule containing part in the vertical direction.

INDUSTRIAL APPLICABILITY

The present invention can be applied to a beverage extraction apparatus for extracting a beverage, e.g., coffee.

REFERENCE SIGNS LIST

1' Coffee extraction apparatus
8' Conduit channel
8A Needle-like end portion
10, 11 First filter member, second filter member (restraining member)
102 Granule containing part
202 Granule containing part body
202A Upper end wall
202B Lower end wall
102D Hold mechanism
14 Rotary mechanism
102A Upper opening
102B Lower opening
M Granule layer
200, 201, 204, 205 Discharge facilitating mechanism
300 Coffee extraction apparatus
304B Granule containing part
304C Upper opening
304D Lower opening
305, 303 First filter member, second filter member (restraining member)
302 Upper lid member
306 Lower lid member
301 Valve
301A Valve body
400 Coffee extraction apparatus
401 Conduit channel
402 Upper lid member
402A Upper opening
406 Lower lid member
406A Lower opening
404B Granule containing part body
404C Upper opening
404D Lower opening
405, 403 First filter member, second filter member (restraining member)
420 Granule containing part

The invention claimed is:

1. A beverage extraction apparatus comprising:
a granule containing part adapted to contain granules for extraction of a beverage, which comprises:
a first detachable mesh restraining member for restraining the granules and allowing passage of liquids, and
a second detachable mesh restraining member for restraining the granules and allowing passage of liquids, wherein the first detachable restraining member and the second detachable restraining member restrain the granules from movement in opposing directions, wherein a combination of the first detachable restraining member and the second detachable restraining member, optionally with walls of the granule containing part, place the granules in a substantially sealed state;
a pouring device for pouring an extraction solvent into the granule containing part from a first direction, wherein the first direction is parallel to the opposing directions;
a collecting device for collecting an extract liquid extracted by the extraction solvent; and
a rotary mechanism for rotating the granule containing part through 180 degrees so as to invert the granule containing part in the first direction so that positioning of the first detachable restraining member and the second detachable restraining member are reversed with respect to the pouring device.

2. The beverage extraction apparatus according to claim 1, wherein the granule containing part has such a shape that the granules can be contained therein in a state of being deposited in generally rectangular form when viewed in a section in an axial direction.

3. The beverage extraction apparatus according to claim 1, wherein the pouring device comprises a single conduit channel having an opening that is open to an upper portion of the granule containing part.

4. The beverage extraction apparatus according to claim 1, wherein the granule containing part comprises an upper opening and a lower opening through which the extraction solvent is poured.

5. The beverage extraction apparatus according to claim 1, wherein the granule containing part comprises a hold mechanism for holding a layer of the granules and one of the restraining members in a predetermined position within the granule containing part.

6. The beverage extraction apparatus according to claim 1, wherein a layer of the granules and the restraining members form a disposable unit.

7. The beverage extraction apparatus according to claim 1, wherein the granule containing part forms a disposable cartridge.

8. The beverage extraction apparatus according to claim 1, further comprising an opening/closing mechanism for opening/closing the upper opening and the lower opening.

9. The beverage extraction apparatus according to claim 7, wherein the disposable cartridge is formed in a capsule-like form that is entirely closed,
wherein the pouring device comprises a needle-like end portion capable of piercing an upper end wall and a lower end wall of the disposable cartridge, and
wherein the upper opening and the lower opening are formed by the needle-like end portion.

10. The beverage extraction apparatus according to claim 1, wherein the granule containing part comprises a discharge facilitating mechanism for facilitating discharge of the extract liquid.

11. The beverage extraction apparatus according to claim 1, wherein the pouring device is capable of performing a two step process for pouring the extraction solvent.

12. The beverage extraction apparatus according to claim 1, wherein the first restraining member and the second restraining member are combined integrally.

* * * * *